United States Patent
Huang

(10) Patent No.: US 12,367,252 B2
(45) Date of Patent: Jul. 22, 2025

(54) METHODS AND APPARATUS TO CLASSIFY WEB CONTENT

(71) Applicant: McAfee, LLC, San Jose, CA (US)

(72) Inventor: Yonghong Huang, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 14 days.

(21) Appl. No.: 17/944,720

(22) Filed: Sep. 14, 2022

(65) Prior Publication Data

US 2023/0195828 A1    Jun. 22, 2023

Related U.S. Application Data

(60) Provisional application No. 63/290,788, filed on Dec. 17, 2021.

(51) Int. Cl.
*G06F 16/90* (2019.01)
*G06F 16/906* (2019.01)
*G06F 16/958* (2019.01)

(52) U.S. Cl.
CPC .......... *G06F 16/958* (2019.01); *G06F 16/906* (2019.01)

(58) Field of Classification Search
CPC .............................. G06F 16/958; G06F 16/906
See application file for complete search history.

(56) References Cited

U.S. PATENT DOCUMENTS

2022/0172247 A1 * 6/2022 Rosen ..................... G06F 16/35

FOREIGN PATENT DOCUMENTS

CN    112926737 A    *    6/2021

OTHER PUBLICATIONS

Devlin et al., "BERT: Pre-training of Deep Bidirectional Transformers for Language Understanding," Proceedings of NAACL-HLT, Minneapolis, Minnesota, Jun. 2-Jun. 7, 2019, Association for Computational Linguistics, 16 pages.
Maaten et al., "Visualizing Data using t-SNE," Journal of Machine Learning Research 9, published Nov. 2008, 27 pages.
Conneau et al., "Unsupervised Cross-lingual Representation Learning at Scale," Proceedings of the 58th Annual Meeting of the Association for Computational Linguistics, Jul. 5-Jul. 10, 2020, 12 pages.

* cited by examiner

*Primary Examiner* — Kristopher Andersen
(74) *Attorney, Agent, or Firm* — Hanley, Flight & Zimmerman, LLC

(57) ABSTRACT

Methods, apparatus, systems, and articles of manufacture are disclosed. An example apparatus to categorize web content includes interface circuitry to receive first results data from a pre-trained model; model tuner circuitry to: determine, based on the first results data, an adjustment to a parameter of the pre-trained model; and provide, via the interface circuitry, the adjustment to the pre-trained model; and feature extractor circuitry to: receive, via the model tuner circuitry, second results data that satisfies a performance threshold; and identify, from the second results data, at least one application specific feature from a tuned version of the pre-trained model.

18 Claims, 14 Drawing Sheets

METHODS AND APPARATUS TO CLASSIFY WEB CONTENT

RELATED APPLICATION

This patent claims the benefit of U.S. Provisional Patent Application No. 63/290,788, which was filed on Dec. 17, 2021. U.S. Provisional Patent Application No. 63/290,788 is hereby incorporated herein by reference in its entirety. Priority to U.S. Provisional Patent Application No. 63/290,788 is hereby claimed.

FIELD OF THE DISCLOSURE

This disclosure relates generally to machine learning and, more particularly, to classifying web content using transformers.

BACKGROUND

In general, the performance of a machine learning model may be correlated to an amount of data used to train the model. In some examples, training a model with additional data may lead to increased performance of a model. In other examples, however, application specific training data may be difficult to obtain in large quantities. In some examples, an application may additionally or alternatively lack the compute resources necessary to efficiently perform large amounts of model training operations.

BRIEF DESCRIPTION OF THE DRAWINGS

In general, the same reference numbers will be used throughout the drawing(s) and accompanying written description to refer to the same or like parts. The figures are not to scale.

Figure 1:
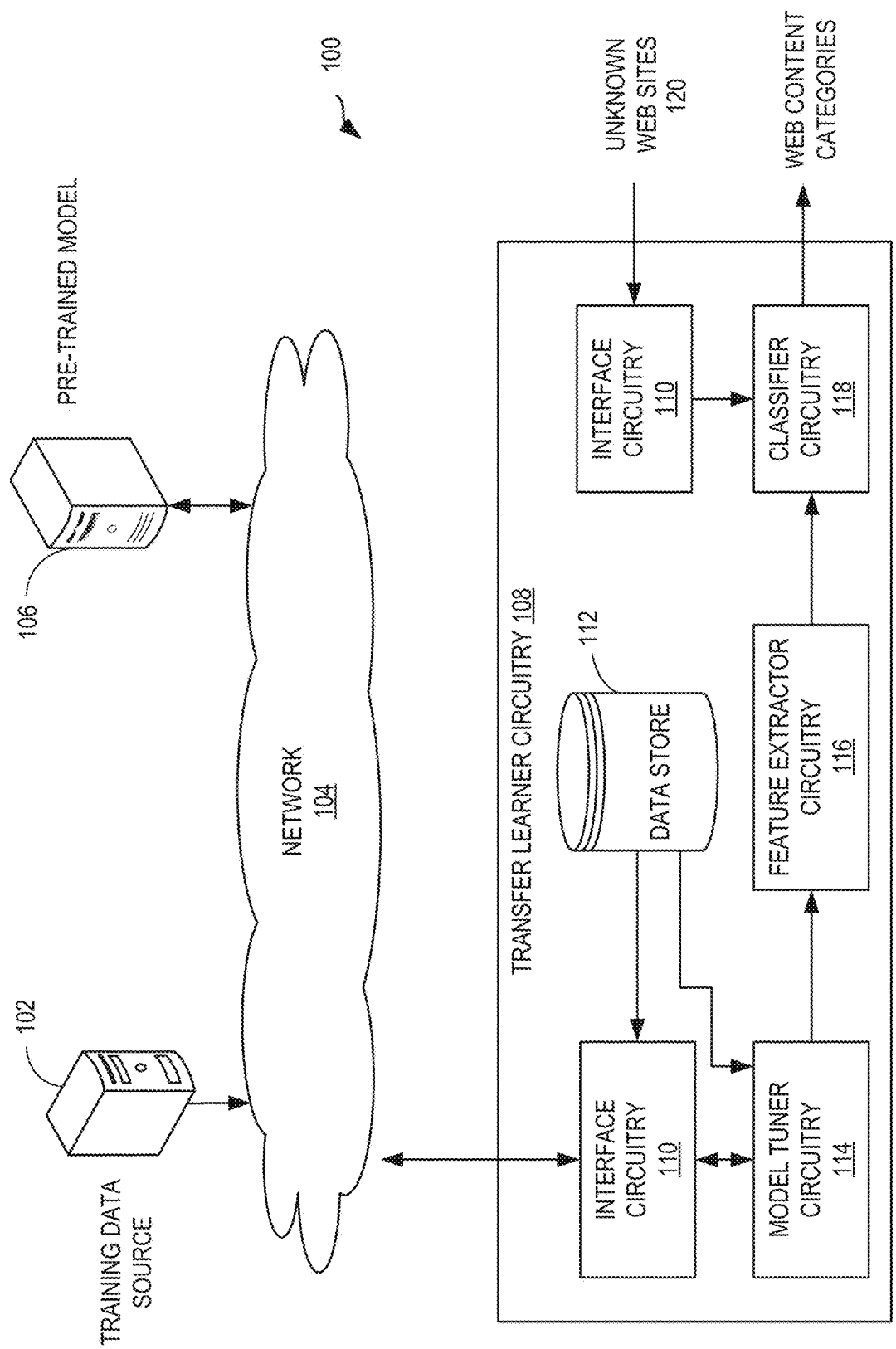
FIG. 1 is an example block diagram of transfer learner circuitry.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Within ML, Artificial Neural Networks (ANNs) refer to a type of model defined by groups of interconnected nodes. An example node may be connected to a first set of input nodes and a second set of output nodes. The example node may receive an amount of data from each of its input nodes, perform an operation using the received data, and provide results data to each of its output nodes. In many examples, nodes of an ANN are organized into layers, where each layer performs a different set or type of operations. Within ANNs, deep learning refers to models that include two or more layers between the input layer and output layer of the network.

Many different types of machine learning models and/or machine learning architectures exist. Examples disclosed herein refer to transformer models. A transformer model is a type of deep learning model that performs operations based on contextual data within input data. For example, in Natural Language Processing (NLP) applications, which aim to analyze text, a transformer model may use the position of words within a sentence as input data to its analysis. Identifying contextual data enables transformer models to prioritize some portions of the input data more than other portions in a process called self-attention. In general, machine learning models/architectures that are suitable to use in the example approaches disclosed herein will be transformer models. However, other types of machine learning models could additionally or alternatively be used such as Convolutional Neural Networks (CNNs), Generative Adversarial Networks (GANs), Recurrent Neural Networks (RNNs), Multilayer Perceptrons (MLPs), Boltzmann machines, Support Vector Machines (SVMs), k-Means clustering, Random forests, decision trees, linear or logistic regression, etc.

To obtain context data, transformer models may process input data in large quantities simultaneously, as opposed to dividing the input data into portions and processing each portion sequentially. For example, a transformer model used in an NLP application may process an entire sentence at once instead of processing individual words. The practice of training with larger quantities of data enables increased parallelization and reduced compute time in transformer models when compared to some other types of ML models like Recurrent Neural Networks (RNNs).

Some ML industry members have leveraged the foregoing reduced compute time to train transformer models with large amounts of training data. For example, in 2019 Google® released Bidirectional Encoder Representation learning from Transformers (BERT). BERT is an open-source model that was trained on BooksCorpus, a collection of novels containing approximately 800 million words, and on Wikipedia®, whose articles collectively contain approximately 2.5 billion words. As another example, in 2020 Meta® released Cross Lingual Model Roberta (XLM-R), a transformer model that was trained on 2.5 terabytes (TB) of data across 100 languages.

BERT and XLM-R may be referred to as pre-trained models because they both enable users to perform a number of NLP tasks on unknown data without having to perform additional training. Examples of NLP tasks may include, but are not limited to, lemmatization, parts of speech tagging, sentence boundary disambiguation, etc. However, in some applications, the results of a pre-trained model may produce suboptimal results. For example, a cybersecurity company may rely on an automated web content categorization tool to determine which sites should be blocked, restricted access to, etc. for a given user. In such examples, the cybersecurity company may require a level of accuracy in web content categorization that pre-trained models such as BERT and XLM-R are unable of providing. In previous solutions, such a cybersecurity company would have to train a new model to perform web content categorization. Training a new model in such circumstances may be inefficient for multiple reasons. For example, obtaining a large enough set of training data to reach the requisite accuracy levels may be time consuming, a large amount of computational resources may be needed to train with the large data set, adding cost, and additional time would be required to train the large data set.

Example methods, systems, and apparatus described herein describe a technique to apply transfer learning to transformer models. As used herein, transfer learning refers to a process of leveraging a pre-trained model (such as BERT and XLM-R) to perform application specific tasks (such as web content categorization) at requisite performance levels. Example methods, systems, and apparatus described herein also describe zero shot learning of transformer models. As used herein, zero shot learning refers to executing a model with unknown data that belongs to a class that the model was not trained on. For example, a transfer model that is trained on NLP data with a single language may be modified according to the teachings of this disclosure to classify web content from multiple other languages at a high degree of accuracy.

FIG. 1 is an example block diagram of transfer learner circuitry. The example system 100 includes an example training data source 102, an example network 104, an example pre-trained model 106, and example transfer learner circuitry 108. The example transfer learner circuitry 108 includes example interface circuitry 110, an example data store 112, example model tuner circuitry 114, example feature extractor circuitry 116, and example classifier circuitry 118.

The example training data source 102 refers to a source of data that may be used to train a transformer model. While the example training data source 102 is illustrated as a single entity in FIG. 1, in practice, training data may be provided from any number of sources. For example, the example training data source 102 for BERT includes both BookCorpus and Wikipedia®. In another example, the training data source 102 for XLM-R includes a web archive managed by Common Crawl®. In examples where the training data is text based, the training data source 102 may be referred to as a corpus.

The example network 104 enables components within the example system 100 to communicate with one another. In this example, the network 104 is the Internet. However, the example network 104 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example pre-trained model 106 refers to any transformer model that has been trained prior to use with the example transfer learner circuitry 108. The example pre-trained model 106 is trained using the example training data source 102. The example pre-trained model 106 may be trained using any amount of computational resources for any amount of time. The example pre-trained model 106 may be implemented by, but is not limited to, BERT, XLM-R, etc. The example pre-trained model 106 includes parameters that influence how an output is calculated for a given set of inputs. For example, the parameters may include, but are not limited to, weights corresponding to various nodes of a deep neural network. In some examples, the output of the pre-trained model 106 may be referred to as results data.

As used herein, an example pre-trained model 106 may be described as either an untuned model or a tuned model. An untuned model is an example pre-trained model 106 with parameter values that are only based on the example training data source 102. A tuned model, however, refers to an example pre-trained model 106 with parameter values that were initially based on the example training data source 102 but have since been adjusted (i.e., tuned) by the example model tuner circuitry 114 to perform an application specific task and satisfy an error threshold. The example model tuner circuitry 114 and error threshold are described further below.

The example transfer learner circuitry 108 modifies the pre-trained model 106 to perform an application specific task at requisite performance levels according to the teachings of this disclosure. In examples described herein, the application specific task is web content categorization. In other examples, a different application specific task may be used. The example transfer learner circuitry 108 of FIG. 1 may be instantiated (e.g., creating an instance of, bring into being for any length of time, materialize, implement, etc.) by processor circuitry such as a central processing unit executing instructions. Additionally or alternatively, the example transfer learner circuitry 108 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 1 may be implemented by microprocessor circuitry executing instructions to implement one or more virtual machines and/or containers.

The example interface circuitry 110 enables communication between components of the example transfer learner circuitry and the rest of the system 100. For example, the interface circuitry 110 may provide training data from the data store 112 to the pre-trained model 106 via the network 104. Additionally, the example interface circuitry 110 may also receive results data from the pre-trained model 106 and provide it to the model tuner circuitry 114. The example interface circuitry 110 may also receive parameter adjustments from the model tuner circuitry 114 and provide it to the pre-trained model 106. The example interface circuitry 110 may also obtain unknown websites 120 from an external source (e.g., the Internet) and provide the unknown websites 120 to the example classifier circuitry 118. In some examples, the interface circuitry 110 is instantiated by processor circuitry executing interface instructions and/or configured to perform operations such as those represented by the flowchart of FIG. 4.

In some examples, the example transfer learner circuitry 108 includes means for communicating. For example, the means for communicating may be implemented by interface circuitry 110. In some examples, the interface circuitry 110 may be instantiated by processor circuitry such as the example processor circuitry 1012 of FIG. 10. For instance, the interface circuitry 110 may be instantiated by the example microprocessor 1100 of FIG. 11 executing machine executable instructions such as those implemented by at least blocks 404, 410 of FIG. 4. In some examples, the interface circuitry 110 may be instantiated by hardware logic circuitry, which may be implemented by an ASIC, XPU, or the FPGA circuitry 1200 of FIG. 12 structured to perform operations corresponding to the machine readable instructions. Additionally or alternatively, the interface circuitry 110 may be instantiated by any other combination of hardware, software, and/or firmware. For example, the interface circuitry 110 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example data store 112 within the example transfer learner circuitry 108 stores application specific machine learning data. For example, in FIG. 1, the example data store 112 includes web content that is known to be labeled correctly. The example data store 112 may additionally store a second copy of the same web content that is unlabeled, which may be used as a test input. The example data store 112 may additionally include feature data corresponding to the web content. In other examples, the example data store 112 may store other types of application specific machine learning data.

The example data store 112 is implemented by any memory, storage device and/or storage disc for storing data such as, for example, flash memory, magnetic media, optical media, solid state memory, hard drive(s), thumb drive(s), etc. Furthermore, the data stored in the example data store 112 may be in any data format such as, for example, binary data, comma delimited data, tab delimited data, structured query language (SQL) structures, etc. While, in the illustrated example, the example data store 112 is illustrated as a single device, the example data store 112 and/or any other data storage devices described herein may be implemented by any number and/or type(s) of memories.

The example model tuner circuitry 114 within the example transfer learner circuitry 108 receives results data from the example pre-trained model 106. The example model tuner circuitry 114 compares the results data to expected data to determine whether a performance threshold is satisfied. Any number of metrics may be used to measure outcome of a model and determine whether a performance threshold is satisfied. Example performance metrics are discussed further in connection with FIGS. 5-9. If the example model tuner circuitry 114 determines the results data fails to satisfy the performance threshold, the example model tuner circuitry 114 determines adjustments to one or more parameters of the example pre-trained model 106 based on the comparison. If the example model tuner circuitry 114 determines the results data does satisfy the threshold, the example model tuner circuitry 114 provides a description of any parameter adjustments made to the example feature extractor circuitry 116. In some examples, the model tuner circuitry 114 is instantiated by processor circuitry executing model tuner instructions and/or configured to perform operations such as those represented by the flowchart of FIG. 4.

In some examples, the example transfer learner circuitry 108 includes means for tuning. For example, the means for tuning may be implemented by model tuner circuitry 114. In some examples, the model tuner circuitry 114 may be instantiated by processor circuitry such as the example processor circuitry 1012 of FIG. 10. For instance, the model tuner circuitry 114 may be instantiated by the example microprocessor 1100 of FIG. 11 executing machine executable instructions such as those implemented by at least blocks 406, 408 of FIG. 4. In some examples, the model tuner circuitry 114 may be instantiated by hardware logic circuitry, which may be implemented by an ASIC, XPU, or the FPGA circuitry 1200 of FIG. 12 structured to perform operations corresponding to the machine readable instructions. Additionally or alternatively, the model tuner circuitry 114 may be instantiated by any other combination of hardware, software, and/or firmware. For example, the model tuner circuitry 114 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example feature extractor circuitry 116 within the example transfer learner circuitry 108 obtains application specific features that the example pre-trained model 106 identifies with adjusted parameters. As used above and herein, a feature is a measurable property of input data that may be identified by a ML model and used to form an output. Different types of input data may include different features. For example, in speech recognition, a feature may be a length of a sound, the loudness of a sound, etc. In another example, features of web content categorization may include but are not limited to a format of a web site, a number of words on a web site, an average sentence length, a number of key words that may be included in a web site, etc. In some examples, nodes in a particular set of layers within a transformer neural network may be referred to as features. In some examples, the feature extractor circuitry 116 is instantiated by processor circuitry executing feature extractor instructions and/or configured to perform operations such as those represented by the flowchart of FIG. 4.

In some examples, the example transfer learner circuitry 108 includes means for extracting. For example, the means for extracting may be implemented by feature extractor circuitry 116. In some examples, the feature extractor circuitry 116 may be instantiated by processor circuitry such as the example processor circuitry 1012 of FIG. 10. For instance, the feature extractor circuitry 116 may be instantiated by the example microprocessor 1100 of FIG. 11 executing machine executable instructions such as those implemented by at least blocks 412 of FIG. 4. In some examples, the feature extractor circuitry 116 may be instantiated by hardware logic circuitry, which may be implemented by an ASIC, XPU, or the FPGA circuitry 1200 of FIG. 12 structured to perform operations corresponding to the machine readable instructions. Additionally or alternatively, the feature extractor circuitry 116 may be instantiated by any other combination of hardware, software, and/or firmware. For example, the feature extractor circuitry 116 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The example classifier circuitry 118 within the example transfer learner circuitry 108 performs an application specific task based on the extracted features. In FIG. 1, the example classifier circuitry 118 classifies the example unknown websites 120 by outputs a prediction of which web content label most accurately describes each of the unknown websites 120. The example unknown websites 120 may be any websites that are not part of the training data in the data store 112. As such, one or more of the unknown websites 120 may not be labeled with a web content category when the example classifier circuitry 118 uses them as inputs.

In some examples, the example transfer learner circuitry 108 includes means for classifying. For example, the means for classifying may be implemented by classifier circuitry 118. In some examples, the classifier circuitry 118 may be instantiated by processor circuitry such as the example processor circuitry 1012 of FIG. 10. For instance, the classifier circuitry 118 may be instantiated by the example microprocessor 1100 of FIG. 11 executing machine executable instructions such as those implemented by at least blocks 414, 416 of FIG. 4. In some examples, the classifier circuitry 118 may be instantiated by hardware logic circuitry, which may be implemented by an ASIC, XPU, or the FPGA circuitry 1200 of FIG. 12 structured to perform operations corresponding to the machine readable instructions. Additionally or alternatively, the classifier circuitry 118 may be instantiated by any other combination of hardware, software, and/or firmware. For example, the classifier circuitry 118 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

The label predictions made by the classifier circuitry 118 may meet requisite performance levels and may be used for any purpose (e.g., cybersecurity). In other examples, the example classifier circuitry 118 may perform a different type of application specific task. In some examples, the example classifier circuitry 118 is instantiated by processor circuitry executing classifier instructions and/or configured to perform operations such as those represented by the flowchart of FIG. 4. In some examples, the terms "label" and "classification" may be used interchangeably.

The example classifier circuitry 118 may be implemented by any type of ML classifier. Example types of ML classifiers include, but are not limited to, decision trees, random forests, gradient boosting, k-nearest neighbors, etc. In some examples, the example classifier circuitry 118 implements the same classification technique used by the pre-trained model 106. In such examples, the classifier circuitry 118 may be viewed as part of an output layer of the transformer neural network. Furthermore, in such examples, the nodes corresponding to features may be viewed as an intermediate layer because they are used as inputs to the classification stage of the transformer neural network. In other examples, the example classifier circuitry 118 implements a different type of ML classifier than the example pre-trained model. In such an example, the nodes corresponding to features may be viewed as an output later of the example pre-trained model 106.

When the example pre-trained model 106 first produces an output based on the test input from the example data store 112, the results data is unlikely to match the expected results (e.g., the known labels also stored in the example data store) at a high-performance level. This inaccuracy may be because the example pre-trained model 106 was trained on the example training data source 102 to perform operations that are more general than and/or unrelated to the application specific task. For example, both BERT and XLM-R, before adjustments by the example transfer learner circuitry 108, are trained to perform general purpose NLP operations such as text translation, language modeling, next sentence prediction, etc. However, neither BERT or XLM-R are specifically trained to perform web content categorization. Advantageously, the example model tuner circuitry 114 may iteratively receive results data from the example pre-trained model 106, compare the results data to the expected data, and provide parameter adjustments back to the pre-trained model 106 to reduce the error between the results data and expected data. Over multiple iterations of parameter adjustments, the error between the results data and expected data may decrease. In doing so, the example model tuner circuitry 114 tunes the example pre-trained model 106 so it can also perform an application specific task (e.g., web content categorization) with a sufficiently low error that satisfies a performance threshold.

The training required to produce the example pre-trained model 106 may require a large amount of data, computational resources, and time. For example, training one version of BERT required sixteen Tensor Processor Units (TPUs) to run for approximately four days. A TPU is an AI accelerator application-specific integrated circuit developed by Google® for neural network machine learning. As such, training BERT may have required greater amounts of time if specialized hardware was not available. This training may be referred to a coarse tuning of the example pre-trained model 106 that enables the performance of generalized tasks. Advantageously, examples described herein describe a fine tuning of the pre-trained model 106 that enable the performance of application specific task. As such, the performance of the application specific tasks at a requisite performance level can be achieved by leveraging the training data, computational resources, and time already invested in the pre-trained model, rather than building a new, application specific model.

Figure 2:
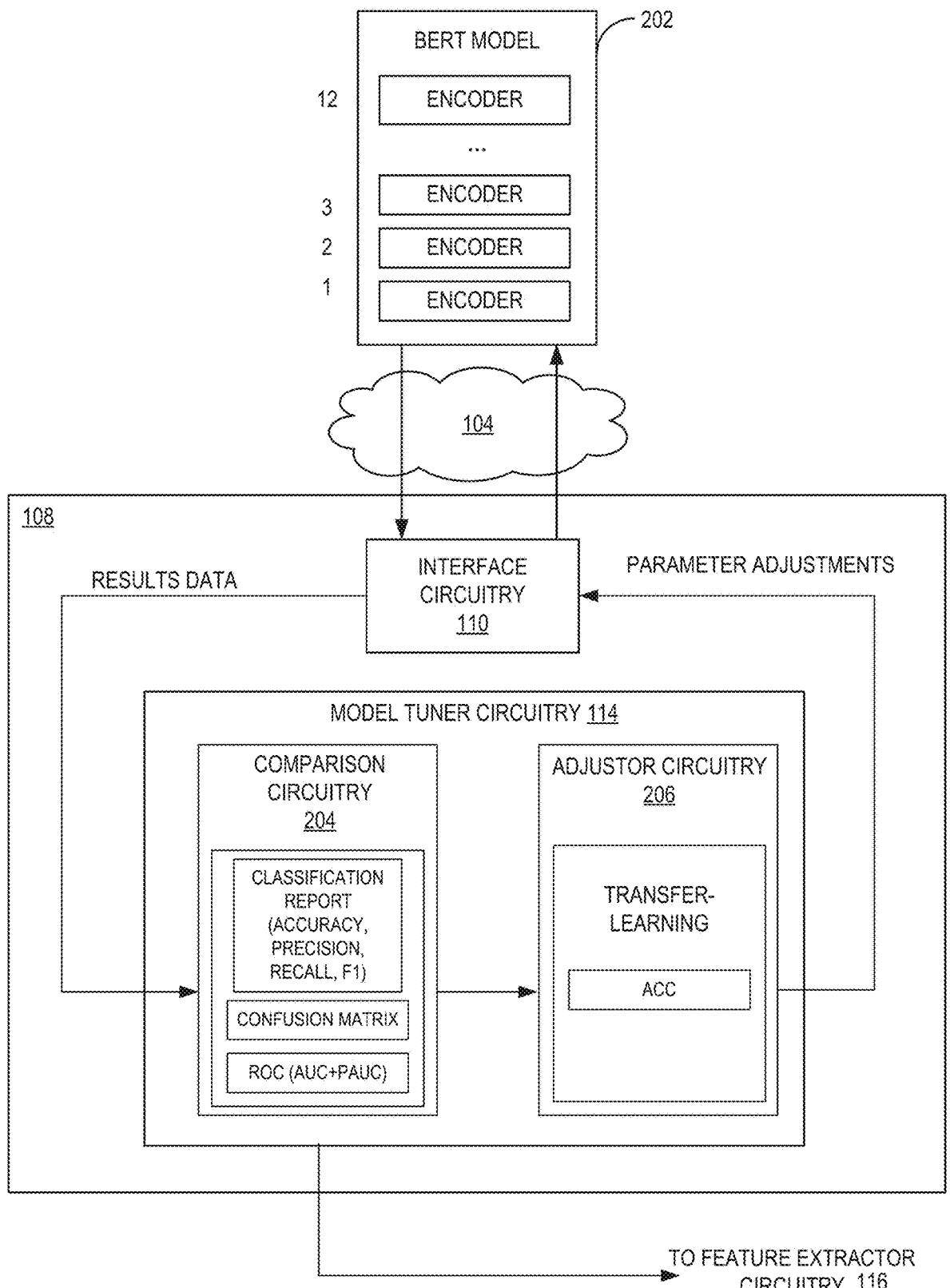
FIG. 2 is an example block diagram of a first pre-trained model and the transfer learner circuitry of FIG. 1.

FIG. 2 is an example block diagram of a BERT model and the model tuner circuitry of FIG. 1. FIG. 2 includes the BERT model 202, the example network 104, the example interface circuitry 110, and the example model tuner circuitry 114. The example model tuner circuitry 114 includes example comparison circuitry 204 and example adjustor circuitry 206.

The example BERT model 202 is an example implementation of the pre-trained model 106. Specifically, the BERT model 202 represents the BERT open source transformer model developed by Google®. The BERT model 202 includes twelve encoders. Each encoder refers to a layer of a transformer neural network. As such, a given encoder may include a group of nodes that each perform an operation and have a weight. A weight of a node is a value that corresponds to the level of impact the node has on operations. Encoder layers are discussed further in connection with FIGS. 7A, 7B. The BERT model 202 receives a set of test data stored in the example training data source 102 and uses it as an input to produce results data.

The example comparison circuitry 204 within the example model tuner circuitry 114 receives results data from the BERT model 202 via the network 104 and the interface circuitry 110. The example comparison circuitry 204 compares sample values from the results data to expected values from the training data stored in the data store 112. For example, the example comparison circuitry 204 may determine whether the label generated by the BERT model 202 for a particular web site matches the label that is stored in the data store 112 for the web site and is known to be correct. The example comparison circuitry 204 uses the comparison to determine whether the example results data satisfies a performance threshold. Performance thresholds are discussed further in connection with FIG. 4.

The example comparison circuitry 204 may make any type of comparison, including but not limited to a classification (e.g., accuracy, precision, recall, F1), a confusion matrix, a receive operating characteristic (ROC) curve, an area under ROC (AUC) curve, partial area under ROC (pAUC) curve. Some example forms of comparison are discussed further in connection with FIGS. 5-9.

The example adjustor circuitry 206 receives a notification from the example comparison circuitry 204 whenever the results data fails to satisfy the performance threshold. The example adjustor circuitry 206 uses the comparison data to determine a set of parameter adjustments that will result in a better performance in a subsequent iteration. For example, the adjustor circuitry 206 may use a gradient descent technique to determine changes to the weight values of nodes such that the error corresponding to a particular node in an nth version of the results data is less than error in the (n−1)th version of the results data. The example adjustor circuitry 206 provides the parameter adjustments to the BERT model 202 via the interface circuitry 110 and the network 104.

The example block diagram of FIG. 2 illustrates the iterative process of fine tuning performed by the example model tuner circuitry 114. When the BERT model 202 produces results data in a first iteration, it does so using parameters that were developed based on its previous training (which used BookCorpus and Wikipedia® as data sets). When the BERT model 202 receives parameter adjustments, it runs the test input data again using the new parameter values. The new parameter values, which are set by the example adjustor circuitry, change the output of the BERT model 202 so it can more accurately perform an application specific task (web content categorization). The example model tuner circuitry 114 also performs fine tuning in an iterative matter when the example pre-trained model 106 implements XLM-R or any other type of transformer model. As such, an application specific machine learning model can be developed according to the teachings of this disclosure without needing to obtain an amount of application specific training data similar in magnitude to the training data source 102 (e.g., billions of words in the case of the BERT model 202).

Figure 3:
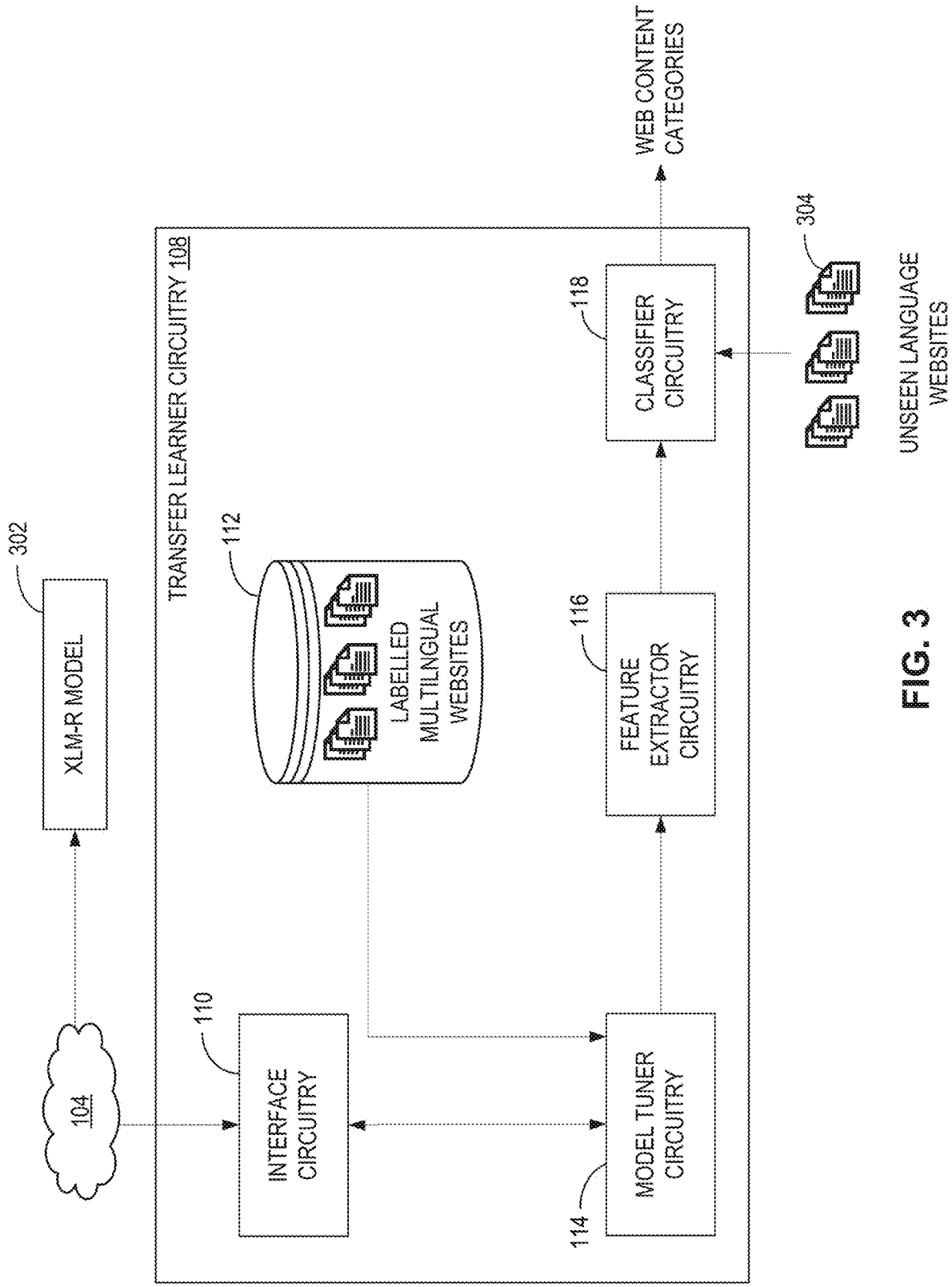
FIG. 3 is an example block diagram of a second pre-trained model and the transfer learner circuitry of FIG. 1.

FIG. 3 is an example block diagram of an XLM-R model and the transfer learner circuitry of FIG. 1. FIG. 3 includes the example XLM-R model 302, example network 104, example transfer learner circuitry 108, and example unseen language websites 304. The example transfer learner circuitry 108 includes the example interface circuitry 110, example data store 112, example model tuner circuitry 114, example feature extractor circuitry 116, and example classifier circuitry 118.

The example XLM-R model 302 is an example implementation of the pre-trained model 106. Specifically, the XLM-R model 302 represents the XLM-Roberta open-source transformer model developed by Meta®. The XLM-R model 202 includes twelve encoders and was trained using materials written in 100 different languages.

In FIG. 3, the example data store 112 includes labeled websites that are multilingual (i.e., websites that are written in more than one language). Despite this, multiple languages exist that are either not included or are present in low quantities within the labeled websites of the example data store 112. As such, some of the unknown websites 120, which may come from any source, may include languages that have little or no representation in the training data set. In FIG. 3, the example unseen languages websites 304 are example implementations of unknown websites 120 that are written in languages with little or no representation in the training data set.

When model tuner circuitry 114 tunes the XLM-R model 302, it adjusts parameters so that the XLM-R model 302 more accurately labels websites written in languages included in the data store 112. In general, the training data is correlated to performance, so the XLM-R model 302 performs best on the languages that are most frequently present in the example data store 112. However, transformer models identify contextual information within input data. In some examples, contextual information can be used to identify features and characteristics of text that span across multiple languages. For example, language independent features may include, but are not limited to, average sentence length, average word length, frequency of phonemes, frequency of syllables, and frequency of different types of words (conjunctions, prepositions, articles, common nouns, proper nouns, adjectives, adverbs, verbs, etc.). As such, when the unseen language websites 304 are received as inputs, the example classifier circuitry 118 can use the language independent features to categorize the websites written in languages that have little or no representation in the training data set. Furthermore, the categorization of web sites may satisfy a performance threshold.

The use of transfer learner circuitry 108 to adjust the XLM-R model 302 using labeled websites with languages 'A', 'B', 'C', and also accurately classify an unknown website with language 'D' is an example of zero shot learning. While zero shot learning may apply to any type of example pre-trained model, the BERT model 202 does not exhibit zero shot learning for web content categorization because the BERT model 202 was only trained on text written in English.

While an example manner of implementing the transfer learner circuitry 108 of FIG. 1 is illustrated in FIGS. 2, 3, one or more of the elements, processes, and/or devices illustrated in FIGS. 2, 3 may be combined, divided, re-arranged, omitted, eliminated, and/or implemented in any other way. Further, the example interface circuitry 110, the example model tuner circuitry 114, the example feature extractor circuitry 116, the example classifier circuitry 118, and/or, more generally, the example transfer learner circuitry 108 of FIG. 1 may be implemented by hardware alone or by hardware in combination with software and/or firmware. Thus, for example, any of the example interface circuitry 110, the example model tuner circuitry 114, the example feature extractor circuitry 116, the example classifier circuitry 118, and/or, more generally, the example transfer learner circuitry 108 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example transfer learner circuitry 108 of FIG. 1 may include one or more elements, processes, and/or devices in addition to, or instead of, those illustrated in FIG. 2, and/or may include more than one of any or all of the illustrated elements, processes and devices.

Figure 4:
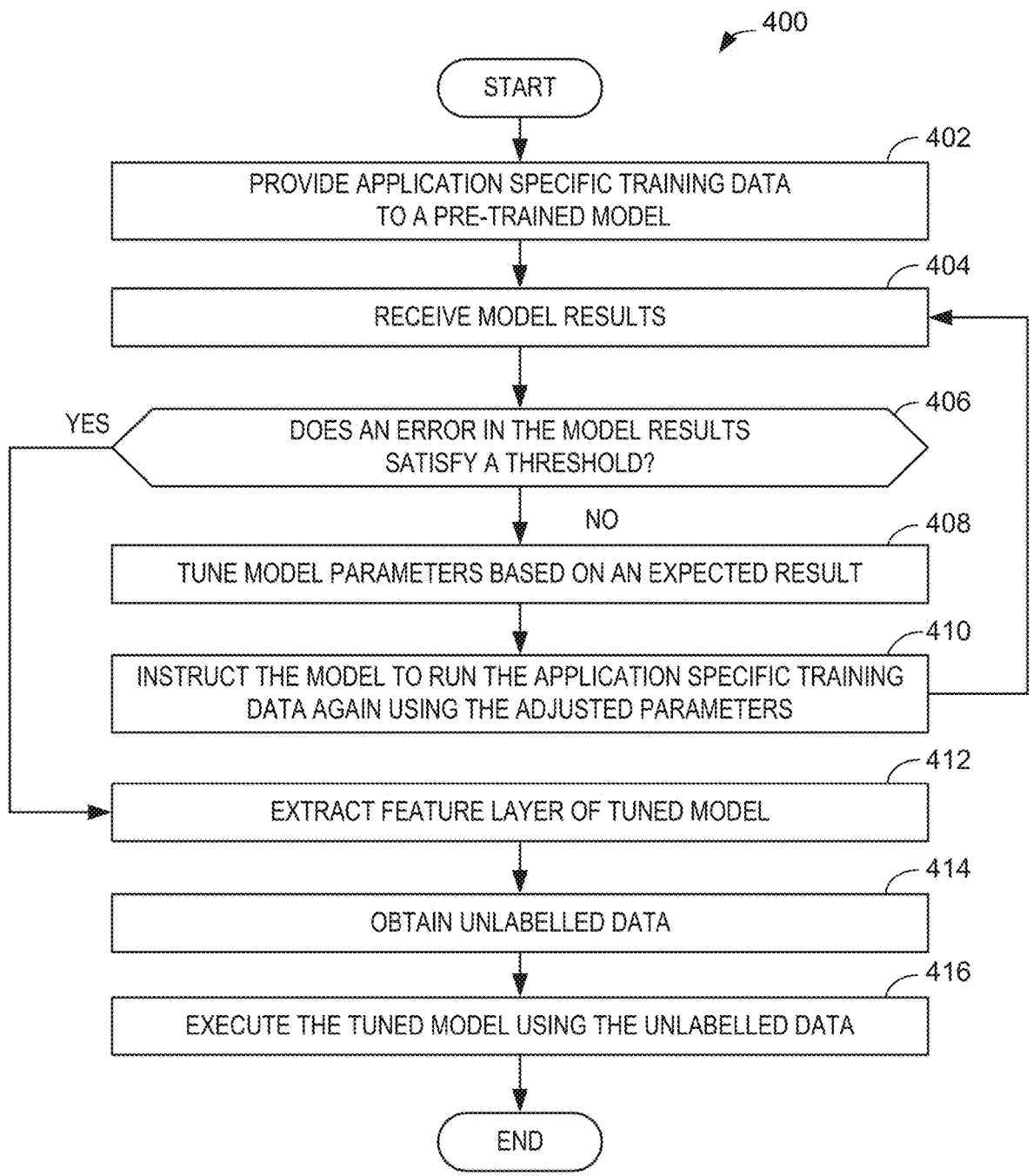
FIG. 4 is a flowchart representative of example machine readable instructions and/or example operations that may be executed by example processor circuitry to implement the transfer learner circuitry of FIG. 1.

A flowchart representative of example machine readable instructions, which may be executed to configure processor circuitry to implement the transfer learner circuitry of FIG. 1, is shown in FIG. 4. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example transfer learner circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to transfer learning. The machine readable instructions and/or the operations 400 of FIG. 4 begin when the example interface circuitry 110 provides application specific training data to the example pre-trained model 106. (Block 402). In FIG. 1, the application specific training data are websites that have a corresponding label stored in the example data store 112. The example interface circuitry 110 may provide an unlabeled version of the websites to the example pre-trained model 106. In other examples, the example interface circuitry 110 may provide a different type of application specific training data. Furthermore, in FIG. 1, the example machine readable instructions and/or operations 400 may implement the pre-trained model 106 referenced in block 402 as either of the BERT model 202 or XLM-R model 302. In other examples, the example machine readable instructions and/or operations 400 may implement a different type of pre-trained model.

The example interface circuitry 110 receives model results. (Block 404). The type of model results may depend on the type of pre-trained model and the type of application specific data. For example, in FIG. 1, the model results of block 404 include labeled websites.

The example model tuner circuitry 114 determines if an error in the model results satisfies a threshold. (Block 406). For example, in FIG. 1, the example model tuner circuitry 114 determines whether the website labels generated by the example pre-trained model 106 match the correct labels for the websites stored in the example data store 112. The example model tuner circuitry 114 may determine the threshold of block 406 is satisfied if the percentage of websites provided to the pre-trained model 106 that are incorrectly labeled is less than or equal to a given value. If the example model tuner circuitry 114 determines the error in the model results satisfies the threshold (Block 406: Yes), the machine readable instructions and/or operations 400 proceed to block 412.

If the example model tuner circuitry 114 determines the error in the model results does not satisfy the threshold (Block 406: No), the example model tuner circuitry 114 tunes the model based on an expected result. (Block 408). Specifically, the example model tuner circuitry 114 determines one or more parameter adjustments that, when implemented by the pre-trained model 106, will result in future model results of block 404 being more similar to the expected results stored in the data store 112 and therefore exhibit a smaller error. For example, in FIG. 1, the example model tuner circuitry 114 may determine that a majority of websites that should be labeled as web content 'A' are incorrectly being labeled by the pre-trained model 106 as web content 'B'. In turn, at block 408, the example model tuner circuitry 114 may provide parameter adjustments to increase the weights in the pre-trained ANN corresponding to the web content 'A' and decrease the weights in the pre-trained ANN corresponding to the web content 'B'.

The example interface circuitry 110 instructs the model to run the application specific data again using the adjusted parameters of block 408. (Block 410). The pre-trained model 106 may be referred to as a tuned model after receiving parameter adjustments from the example model tuner circuitry 114 that satisfy the error threshold of block 406.

The example feature extractor circuitry 116 extracts the feature layer of the tuned model. (Block 412). The example feature extractor circuitry 116 extracts the feature layer in examples where the example classifier circuitry 118 is implemented using a different ML architecture than the classifier provided within the example pre-trained model 106. In other examples where a manufacturer implements the example transfer learner circuitry 108 such that the classifier circuitry 118 refers to the same ML architecture within the example pre-trained model 106, the example machine readable instructions and/or operations 400 may not execute block 412. In such examples, the example machine readable instructions and/or operations 400 may execute block 414 in response to a YES determination at block 406.

The example interface circuitry 110 obtains unlabeled data. (Block 414). The unlabeled data may refer to any type of data that can be used as an input to the tuned model and is separate from training data. For example, in FIG. 1, the unlabeled data is unknown websites 120. The example interface circuitry 110 may obtain the unlabeled data from any source. In FIG. 1, for example, the interface circuitry 110 may obtain the unknown websites from the Internet.

The example classifier circuitry 118 executes the tuned model using the unlabeled data. (Block 416). By analyzing the unlabeled data with the tuned model, the example classifier circuitry 118 may produce results that are more accurate than would have otherwise been produced using the pre-trained model 106 before any parameter adjustments were made.

Figure 5:
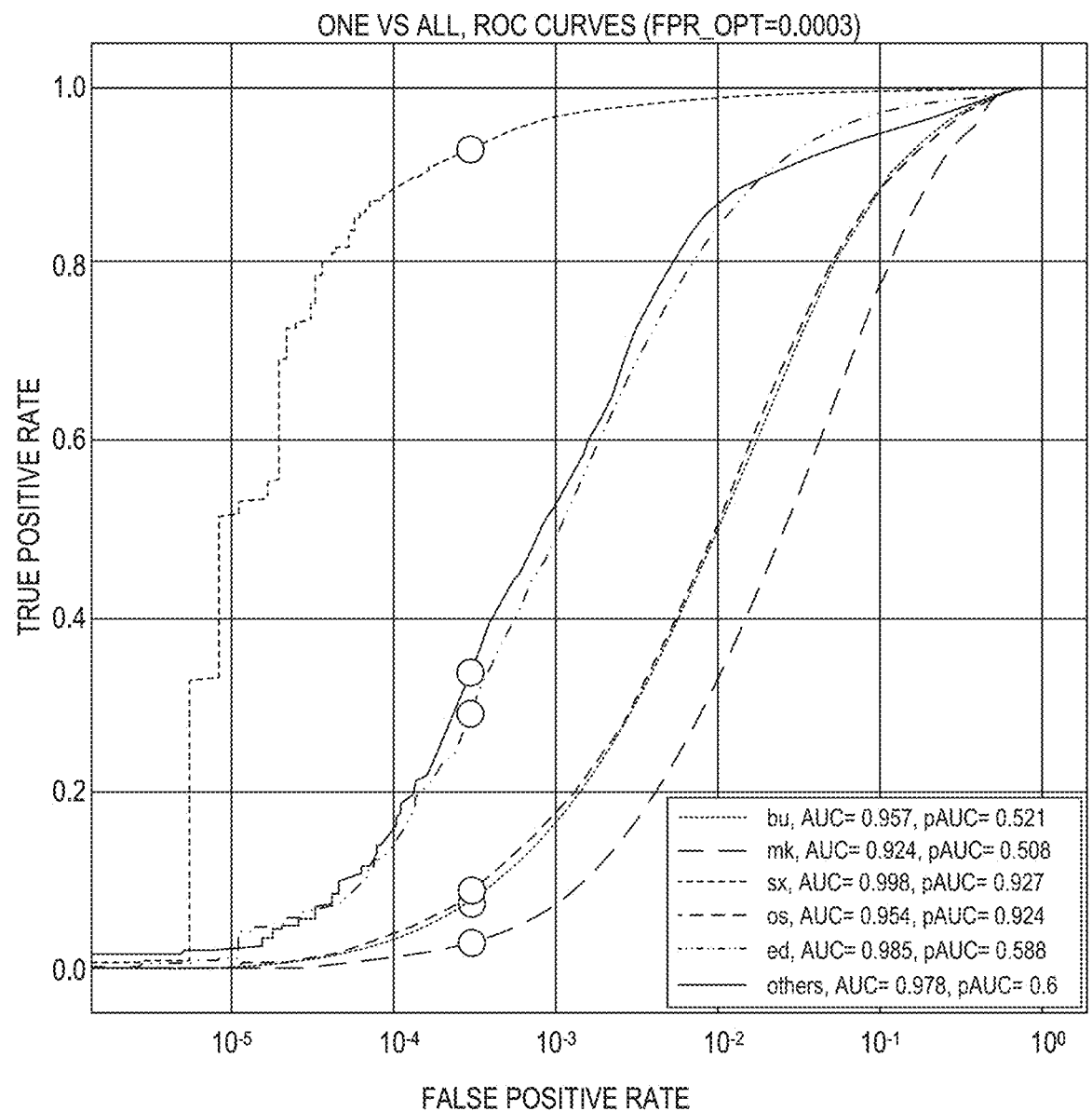
FIG. 5 is a graph illustrating the performance of the transfer learner circuitry using the first pre-trained model of FIG. 2.

FIG. 5 is a graph illustrating the performance of the transfer learner circuitry using the first pre-trained model of FIG. 2. FIG. 5 includes an example graph 502 that illustrates the ROCs for six different web content categories. Specifically, the curve labeled "bu" refers to business websites, the curve labeled "mk" refers to marketing/merchandising websites, the curve labeled "sx" refers to pornographic websites, the curve labeled "os" refers to shopping/merchandising websites, the curve labeled "ed" refers to education/reference websites, and the curve labeled "others" refers to websites that do not fit into one of the five previous categories.

The x axis refers of FIG. 5 shows the false positive rate (FPR) of the example classifier circuitry 118. A false positive for category 'A' occurs when the classifier circuitry 118 incorrectly labels a website as belonging to category 'A' when the website is actually part of a different category, 'B'. The y axis refers to true positive rate (TPR) of the example classifier circuitry 118, which occurs when the classifier circuitry 118 correctly labels a website with category 'A' when the website is indeed part of category 'A'. In a ROC curve such as the example 502, an ideal classifier would be a single point located at FPR=0.0, TPR=1.0. An ideal classifier operating at this data point would label websites with the correct category and never assign an incorrect value.

In practice, ROC curves indicate the quality of a classifier by showing how a change in the FPR corresponds to a change in the TPR. For example, higher quality classifiers are able to achieve high TPR with only a minimal increase in FPR. As a result, the high quality classifiers may have a greater Area Under the ROC curve (AUC) and partial AUC (pAUC) than low quality classifiers. As used herein, pAUC refers to the area under a curve within a specific region of the graph 502, such as the region with low false positive rates. This contrasts AUC, which measures area under the ROC curve across the entirety of the graph 502.

The example graph 502 shows the performance of the example classifier circuitry 118 after the example model tuner circuitry 114 adjusted the parameters of the BERT model 202. In such examples, the classifier circuitry 118 may be referred to use a tuned BERT model as an input. When provided with the unknown websites 120, the example classifier circuitry 118 was most accurate at categorizing pornographic websites. For example, the "sx" ROC curve has an AUC=0.9980 and pAUC=0.9270 at FPR=0.0003. The example graph 502 also shows that, when using the tuned BERT model, the example classifier circuitry 118 was least accurate at categorizing marketing/merchandising websites. For example, the "mk" ROC curve has an AUC=0.9240 and pAUC=0.508 at FPR=0.0003.

Figure 6:
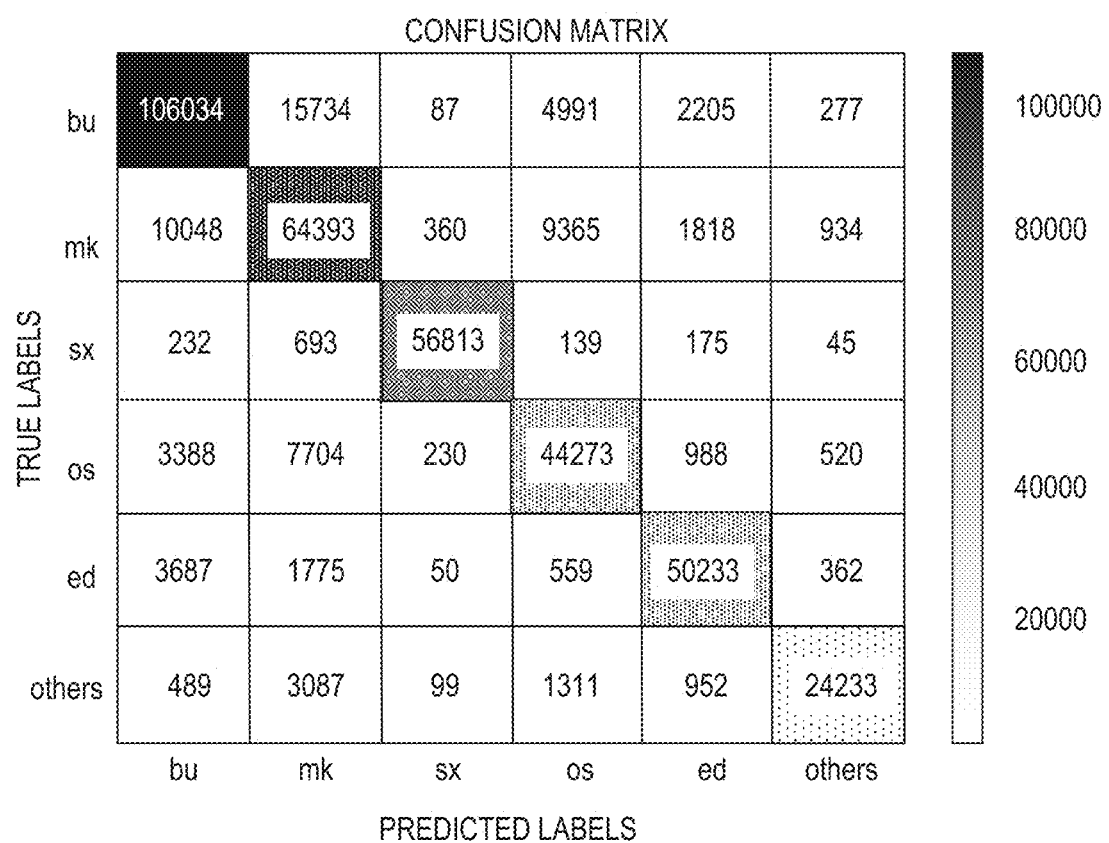
FIG. 6 is a confusion matrix illustrating the performance of the transfer learner circuitry using the first pre-trained model of FIG. 2.

FIG. 6 is a confusion matrix illustrating the performance of the transfer learner circuitry using the tuned BERT model as described in connection with FIG. 5 to analyze the unknown websites 120. Because the unknown websites 120 are not part of the known/labeled websites stored in the data store 112, true labels may be manually assigned to the unknown websites 120 in order to form the confusion matrix 602.

The example confusion matrix 602 tracks the predicted label (i.e., the output of the classifier circuitry 118) on the x axis. On they axis, the example confusion matrix 602 tracks the true labels of the unknown websites 120. For example, if the classifier circuitry 118 correctly labelled a website as a business website, the classification is represented in the confusion matrix 602 as an increment to the value in the square that intersects "bu" on both the x and y axis (i.e., the square in the top left corner). Similarly, if the classifier circuitry 118 wrongly labels a website as others when the correct label is business, the classification is represented in the confusion matrix 602 as an increment to the value in the square that intersects "others" on the x axis and "bu" on the and y axis (i.e., the square in the top right corner).

The example confusion matrix 602 how individual data points of the graph 502 are calculated. For instance, the top row of the confusion matrix 602 shows that $$TPR(bu) = \frac{106034}{106034 + 15734 + 87 + 4991 + 2205 + 277} \approx 0.820$$

$$FPR(bu) = 1 - TPR(bu) \approx 0.180$$

Accordingly, the "bu" ROC curve passes near FPR=0.180, TPR=0.82 in the graph 502. By adjusting the parameters of the BERT model 202, a new confusion matrix with different values can be determined, thus creating another data point.

The example confusion matrix 602 is one example of information used by the example model tuner circuitry 114 to determine what parameter adjustments, if any, should be provided to a pre-trained model 106. For example, suppose a first example confusion matrix showed that the tallies of the squares in the "ed" column are higher than any other tallies in the respective rows. The example model tuner circuitry 114 may use the first example confusion matrix to determine that the current parameter values of the pre-trained model 106 are too biased towards the education category, and that more accurate results may be possible if one or more weights corresponding to the education category were decreased. In such examples, the example model tuner circuitry 114 may send parameter adjustments decreasing the one or more weights corresponding to the education category and may use a second example confusion matrix to determine the impact of the change.

Figure 7A:
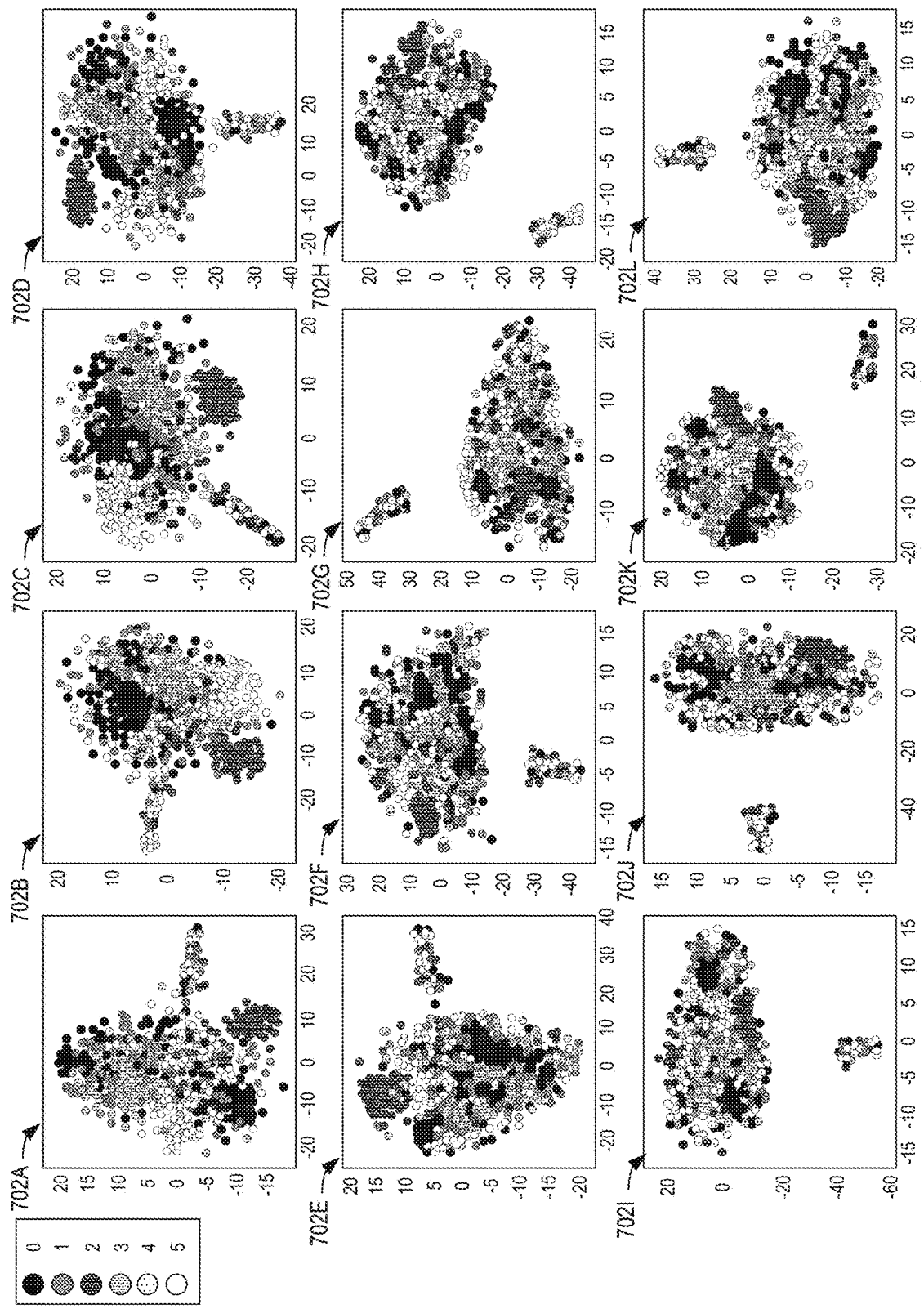
FIG. 7A show multiple graphs illustrating categorization results of the first pre-trained model before adjustments by the example model tuner circuitry of FIG. 1.

FIG. 7A show multiple graphs illustrating categorization results of the BERT model 202 before adjustments by the example model tuner circuitry 114 of FIG. 1. FIG. 7A includes example graphs 702A, 702B, 702C, 702D, 702E, 702F, 702G, 702H, 702I, 702J, 702K, 702L, collectively referred to as example pre-tuning graphs 702.

Figure 7B:
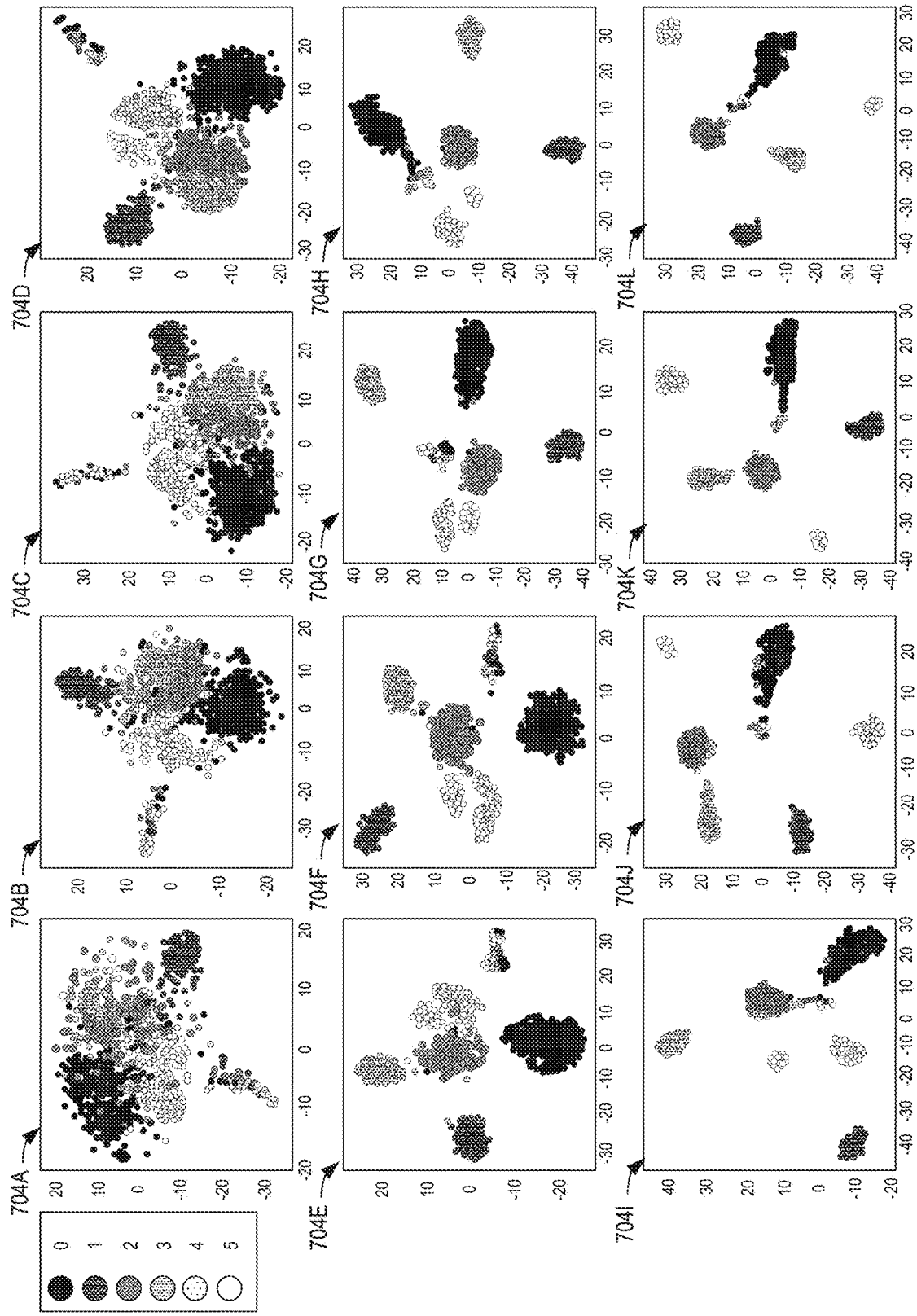
FIG. 7B show multiple graphs illustrating categorization results of the first pre-trained model after adjustments by the example model tuner circuitry of FIG. 1.

FIG. 7B show multiple graphs illustrating categorization results of the BERT model 202 before adjustments by the example model tuner circuitry 114 of FIG. 1. FIG. 7B includes example graphs 704A, 704B, 704C, 704D, 704E, 704F, 704G, 704H, 704I, 704J, 704K, 704L, collectively referred to as example post-tuning graphs 704.

The example pre-tuning graphs 702 of FIG. 7A and example post-tuning graphs 704 both represent the parameters of each of the twelve layers of the BERT model 202. The example pre-tuning graphs 702 are positioned sequentially such that the output terminals of the nodes corresponding to graph 702A are connected to the input terminals of the nodes corresponding to graph 702B, etc. Similarly, the example post-tuning graphs 704 are positioned sequentially such that the output terminals of the nodes corresponding to graph 704A are connected to the input terminals of the nodes corresponding to graph 704B, etc. In both the example pre-tuning graphs 702 and example post-tuning graphs 704, the one or more nodes in a given layer are compressed such that the values of each node can be represented on an XY plane. For example, a single data point in either of the example graphs 702C, 704C represents the output of the third layer of the BERT model 202 for a single website.

The data points of each graph of FIGS. 7A, 7B are shaded to represent which of the six different categories described previously (business, marketing, pornography, shopping, education, other) the given website should be categorized as. Therefore, a graph in either of FIGS. 7A, 7B that shows separate clusters of shaded data points, with most or all points in a cluster corresponding to the same shading, indicates that the particular layer represented by that graph produces similar outputs for different websites that share the same category. As a result, graphs that show high amounts of spatial separation based on the category of the data points may be considered more accurate than graphs where data points of different categories are close to one another.

The example pre-tuning graphs 702 of FIG. 7A represent the output of the BERT layers before any parameter adjustments are made by the example model tuner circuitry 114. Rather, the BERT model 202 uses the pre-trained parameter values that were developed based on the training data source 102 to produce the results shown in the pre-tuning graphs 702. Because the training data source 102 did not include training data that was specifically designed develop web content categorization functionality, the BERT model 202 performs poorly at the task of web content categorization using the pre-trained parameter values. As a result, there is minimal separation between the various web categories in any of the pre-tuning graphs 702. Furthermore, the time and computational resources required to continue to run the BERT model 202 prior to parameter adjustments does little to improve the web categorization results. For example, the result in the example graph 702F, which represents an output after five layers of computation, is visually similar to the example graph 702L, which represents the output after all twelve layers of computation.

The example post-training graphs 704 of FIG. 7B represent the output of the BERT layers after the model tuner circuitry 114 has adjusted the parameters to satisfy an error threshold. That is, the parameter values used to produce the results in the example post-training graphs 704 were set by the example model tuner circuitry 114 to implement an application specific functionality (web content categorization) within the BERT model 202. In doing so, the twelve layers of the BERT model 202 are able to incrementally improve performance such that example graph 704B has more separation between web categories than example graph 704A, example graph 704C has more separation between web categories than example graph 704B, etc. The final output of the tuned BERT model, example graph 704L, shows distinct clusters with minimal overlap. As a result, when analyzing unknown websites 120, the example classifier circuitry 118 may perform a categorization technique such as k-means clustering based on example graph 704L to determine which group of data points the unknown website is closest to. The example classifier circuitry 118 may then assign the unknown website the label that corresponds to the closest group of points at a high degree of accuracy.

Figure 8:
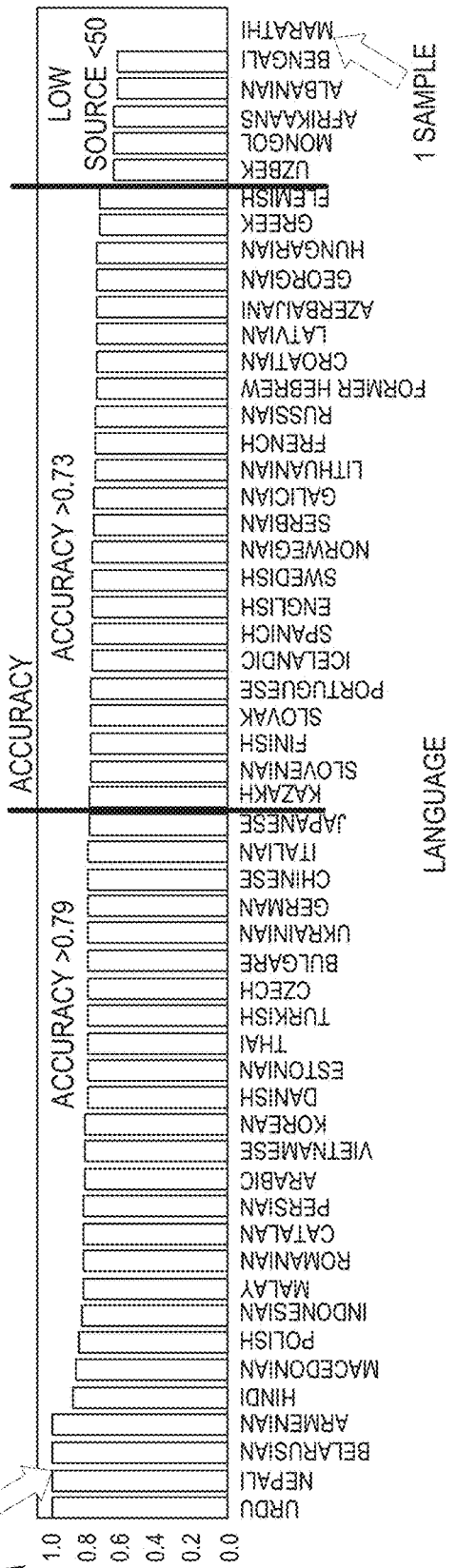
FIG. 8 is a graph illustrating the performance of the transfer learner circuitry of FIG. 1 using the second pre-trained model of FIG. 3.

FIG. 8 is a graph illustrating the performance of the transfer learner circuitry 108 of FIG. 1 using the XLM-R model 302 of FIG. 3. FIG. 8 includes an example table 802 and an example graph 804.

The example table 802 includes a language column that describes the different languages of websites the example XLM-R model 302 can label with web content categories. The example table 802 lists some of the languages the XLM-R model 302 analyzes, Hindi, Macedonian, Polish, Indonesian, German, and Japanese, in their own separate rows. The example table 802 also represents Urdu, Nepali, Belarusian, and Armenian in a single row.

The example table 802 includes a training sample size column that describes the number of websites used to adjust the parameters of the XLM-R model 302 to achieve web content categorization functionality. For example, in the illustrative example of FIG. 8, the example data store 112 includes less than 50 labeled websites written in each of Urdu, Nepali, Belarusian, and Armenian, 503 labeled websites written in Hindi, 250 labeled websites written in Macedonian, etc.

In some examples, the number of labeled websites per language may be determined in part by the amount of computational resources available to perform training. For example, in the illustrative example of FIG. 8, more than 100,000 labeled websites were available for each of the Polish, German, and Japanese languages. However, the example transfer learner circuitry 108 produced the results shown in the graph 804 by adjusting parameters with only 20,000 labeled websites for each of the Polish, German, and Japanese languages. As such, FIG. 8 describes an example where, to reduce computational expenses, a manufacturer populates the example data store 112 by down sampling the number of languages with a sufficiently large set of labeled websites.

The example table 802 includes a test sample size column that describes, in the illustrative example of FIG. 8, the number of unknown websites 120 that were written in a given language. For example, less than 10 unlabeled websites written in each of Urdu, Nepali, Belarusian, and Armenian, 148 unlabeled websites written in Hindi, etc., comprise the unknown websites 120 that were subsequently labelled by the example classifier circuitry 118.

Unlike the example BERT model 202, which labeled websites under one of six different web content categories, the example XLM-R model 302 labels websites as belonging to one of twenty different categories. Accordingly, the example table 802 includes a number of test categories column that describe how many of the twenty categories are represented in the test sample size. For example, each of the 74,968 German websites in the example data store 112 belong to one of nineteen different categories. In contrast, there are only ten unique categories that may be assigned to the 503 Hindi websites.

The example table 802 shows the accuracy of the example XLM-R model 302 after the model tuner circuitry 114 adjusted the parameters to enable web content categorization functionality. The example graph 804 shows the same accuracy data in full for all 59 languages present in the tuned XLM-R model 302 labelled websites for within the illustrative example of FIG. 8. The example graph 804 shows the tuned XLM-R model 302 had an accuracy of 73% or higher for 49 of the 59 languages tested. The remaining five languages that the XLM-R model 302 categorized with less than 73% accuracy are all languages with less than 50 websites in the example data store 112.

Figure 9:
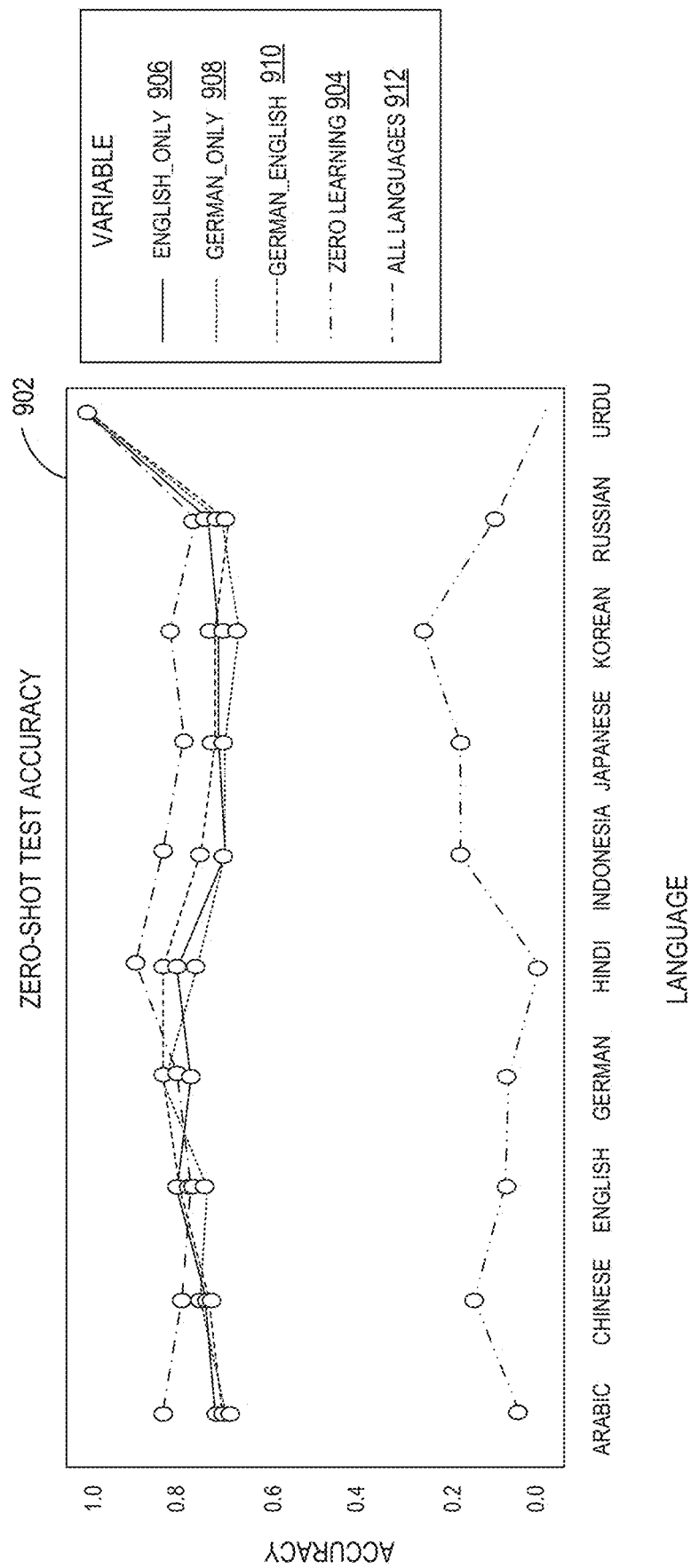
FIG. 9 is a graph illustrating the zero-shot capability of the transfer learner circuitry of FIG. 1 using the second pre-trained model of FIG. 3.

FIG. 9 is a graph illustrating the zero-shot capability of the transfer learner circuitry 108 of FIG. 1 using the XLM-R model 302 of FIG. 3. FIG. 9 shows an example graph 902 that includes an example zero learning signal 904, an example English only signal 906, an example German only signal 908, an example German and English signal 910, and an example all languages signal 912. The x axis of the graph 902 shows ten of the 59 languages that the example XLM-R model 302 can analyze to determine web content categories.

They axis of the example graph 902 shows the accuracy of the example classifier circuitry 118 to label websites in each of the ten various languages.

Each of the five signals in the example graph 902 are produced using a different version of the example XLM-R model 302. For example, to produce the data points in the zero learning signal 904, the example classifier circuitry 118 labeled websites based on an XLM-R model 302 model whose parameters were developed solely on the example training data source 102. In such an example, the XLM-R model 302 model has "zero learning" because the model tuner circuitry 114 has not adjusted the parameters to enable performance of the application specific task (web content categorization). As a result, the example zero learning signal 904 exhibits low accuracy in the illustrative example of FIG. 9. For example, approximately nine of the ten languages shown in the example graph 902 were labelled accurately 20% of the time or less, and the remaining tenth language was labelled accurately less than 40% of the time.

Excluding the zero learning signal 904, the remaining four signals in the example graph 902 are based on an XLM-R model 302 that had parameters adjusted by the example model tuner circuitry 114 to satisfy an error threshold. When training each of the four versions of the XLM-R model 302, the example data store 112 contained a different set of labeled websites. For example, before the example classifier circuitry 118 labeled websites to produce the data points in the English only signal 906, the example model tuner circuitry 114 adjusted parameters based on a training data set that only contained labelled English websites. Similarly, the German only signal 908 is based on a tuned XLM-R model 302 with adjusted parameters that are based on only labelled German websites, the German and English signal 910 is based on a tuned XLM-R model 302 with adjusted parameters that are based on labelled German websites and labelled English websites, but is not based on labelled websites written in other languages, and the all languages signal 912 is based on a tuned XLM-R model 302 with adjusted parameters based on all 59 of the languages from the illustrative example of FIG. 8.

The example graph 902 shows that XLM-R model 302 corresponding to the example all languages signal 912 had the highest average accuracy of FIG. 9, and that the XLM-R model 302 corresponding to the example zero learning signal 904 had the lowest average accuracy of FIG. 9. These results may be largely due to the abundance and lack of languages that were used to train the respective models to perform web content categorization.

The XLM-R models that correspond to the English only signal 906, German only signal 908, and German and English signal 910 also exhibit high accuracy (i.e., more than 60% accurate for each language and each model), despite each model being trained on websites written in two or less languages. As such, FIG. 9 provides an example of zero shot learning by showing XLM-R models that accurately label websites in languages such as Arabic, Chinese, Hindi, etc., without the transfer learner circuitry 108 ever adjusting the model based on a labelled website written in those languages. In such examples, zero shot learning may occur because the example model tuner circuitry 114 may adjust the parameters of the XLM-R transformer models to find and analyze contextual information that are shared by a multitude of languages.

Figure 10:
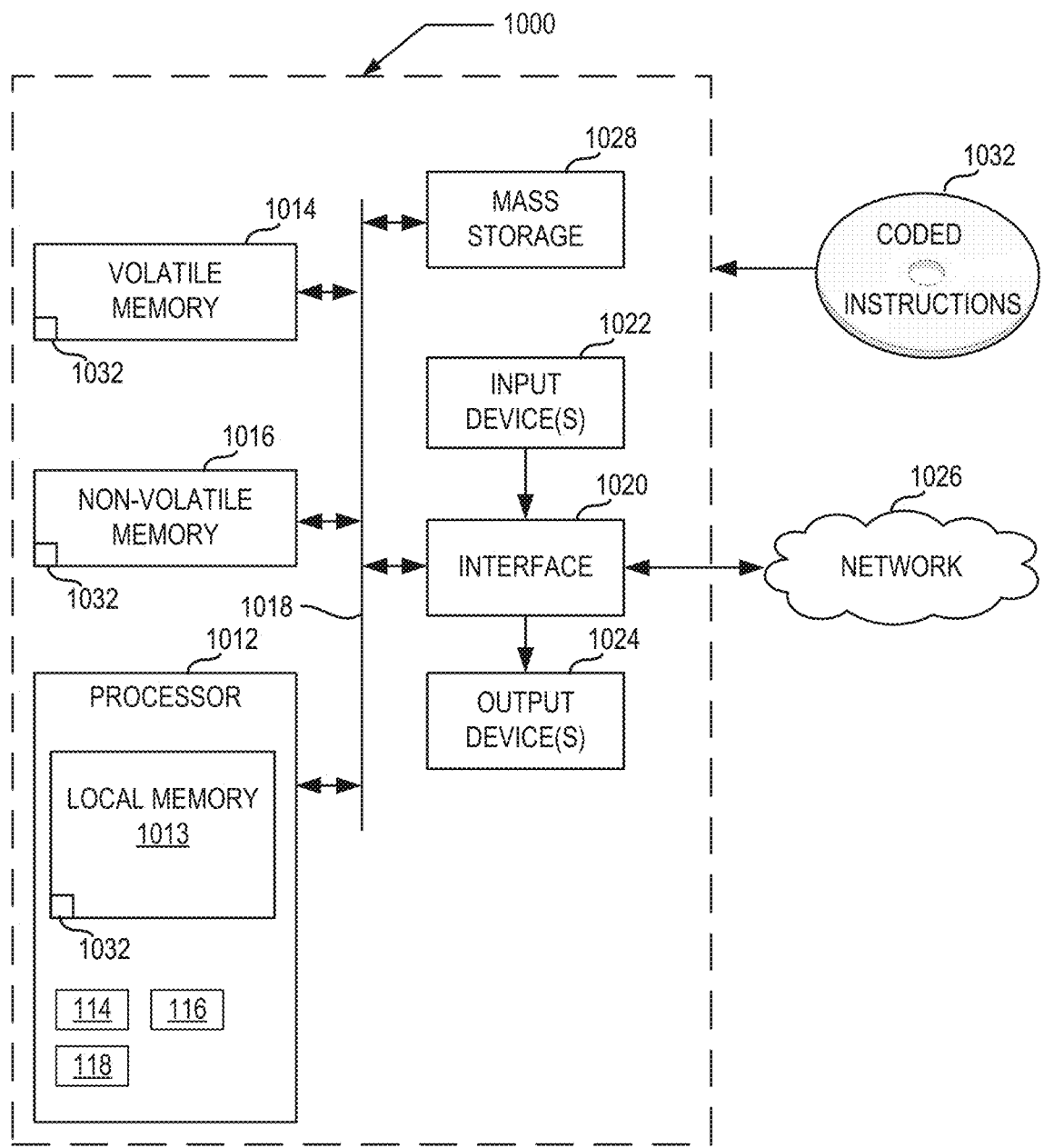
FIG. 10 is a block diagram of an example processing platform including processor circuitry structured to execute the example machine readable instructions and/or the example operations of FIG. 4 to implement the transfer learner circuitry of FIG. 1.

FIG. 10 is a block diagram of an example processor platform 1000 structured to execute and/or instantiate the machine readable instructions and/or the operations of FIG. 4 to implement the example transfer learner circuitry 108 of FIG. 1. The processor platform 1000 can be, for example, a server, a personal computer, a workstation, a self-learning machine (e.g., a neural network), a mobile device (e.g., a cell phone, a smart phone, a tablet such as an iPad'), an Internet appliance, a digital video recorder, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example model tuner circuitry 114, the example feature extractor circuitry 116, and the example classifier circuitry 118.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 4, may be stored in the mass storage device 1028, in the volatile memory 1014, in the non-volatile memory 1016, and/or on a removable non-transitory computer readable storage medium such as a CD or DVD.

Figure 11:
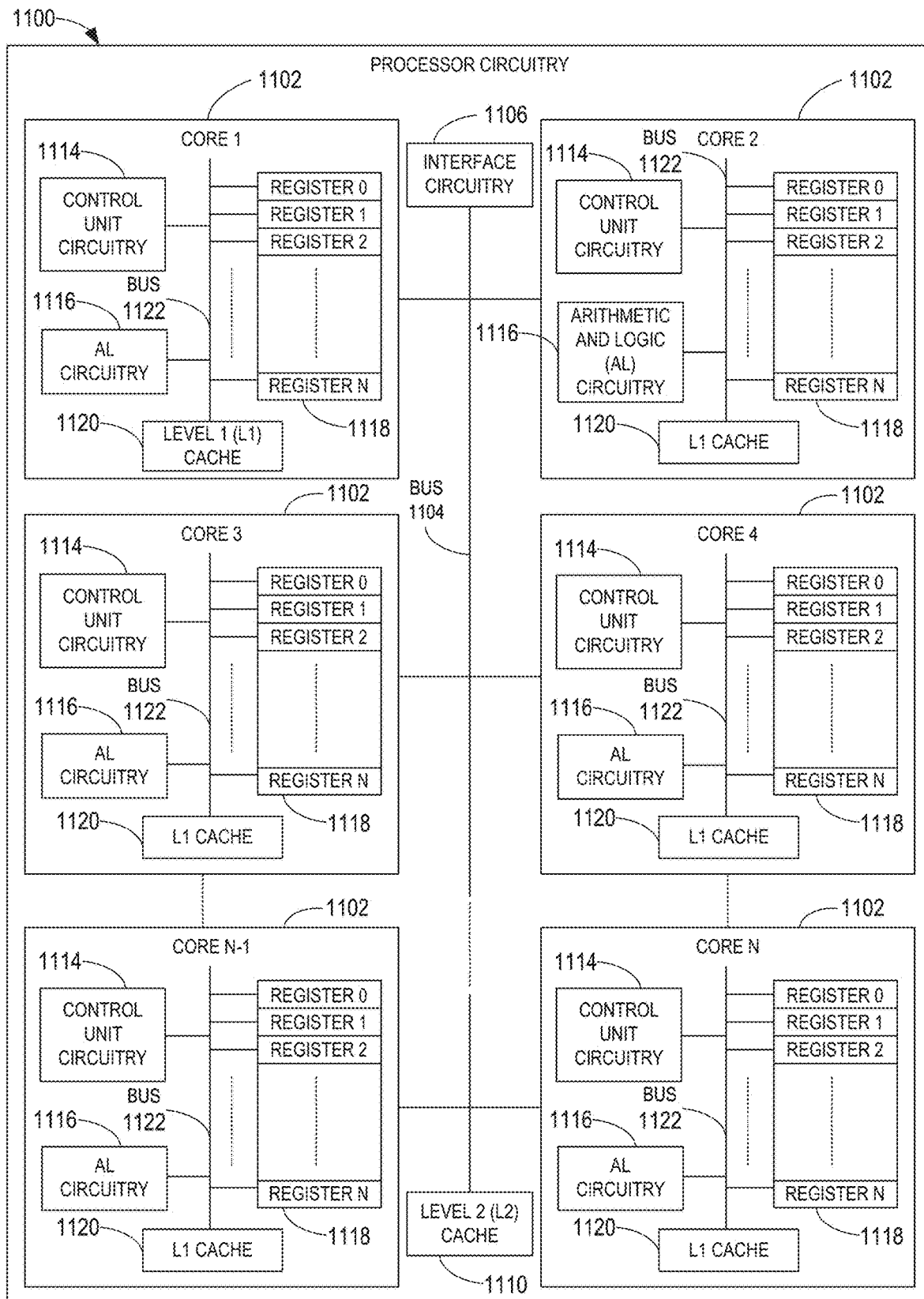
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowchart of FIG. 4 to effectively instantiate the transfer learner circuitry 108 of FIG. 1 as logic circuits to perform the operations corresponding to those machine readable instructions. In some such examples, the transfer learner circuitry 108 of FIG. 1 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIG. 4.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
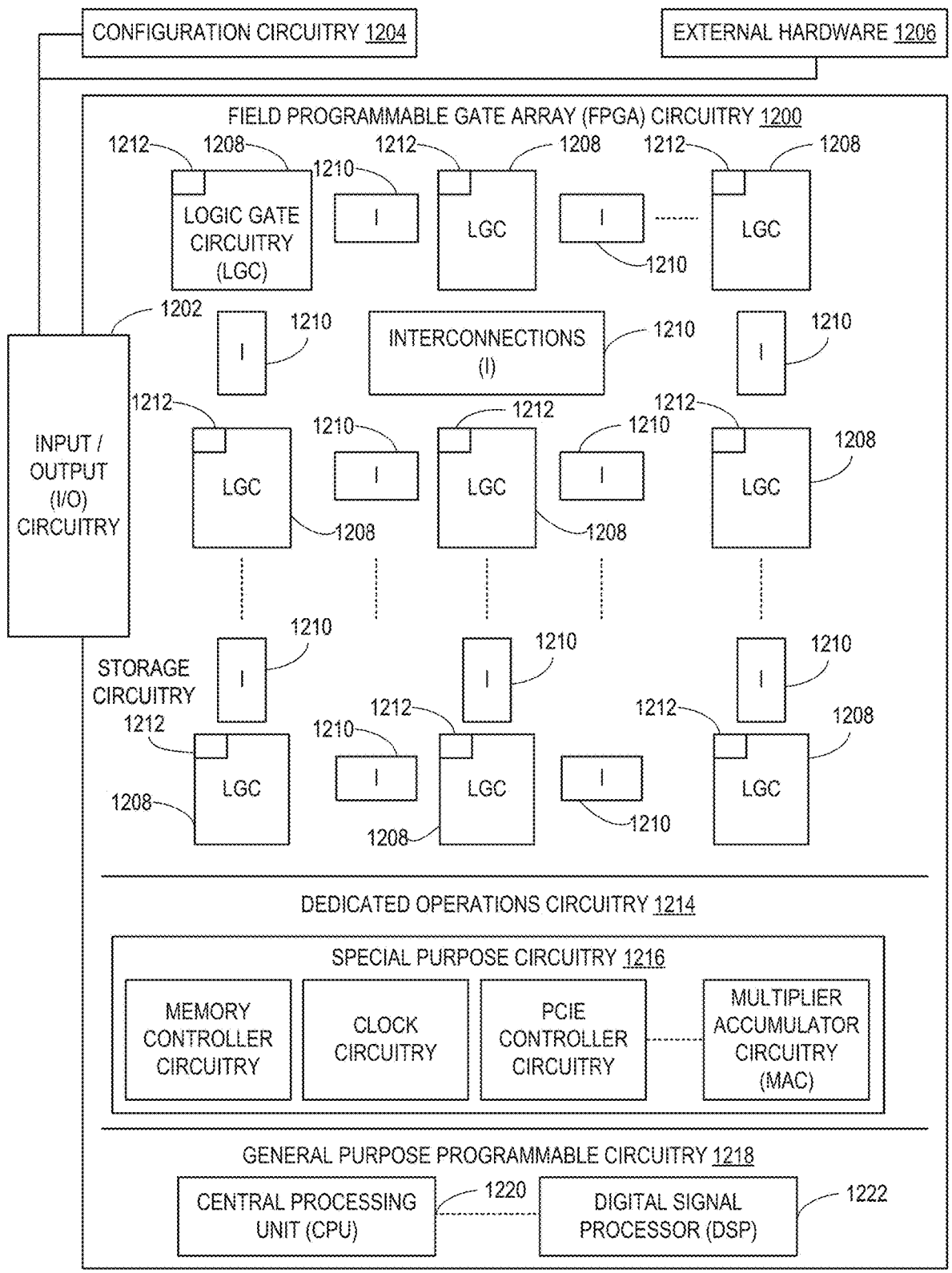
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart of FIG. 4 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart of FIG. 4. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 1200 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIG. faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIG. _ and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowchart of FIG. 4 may be executed by one or more of the cores 1102 of FIG. 11, a second portion of the machine readable instructions represented by the flowchart of FIG. 4 may be executed by the FPGA circuitry 1200 of FIG. 12, and/or a third portion of the machine readable instructions represented by the flowchart of FIG. 4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
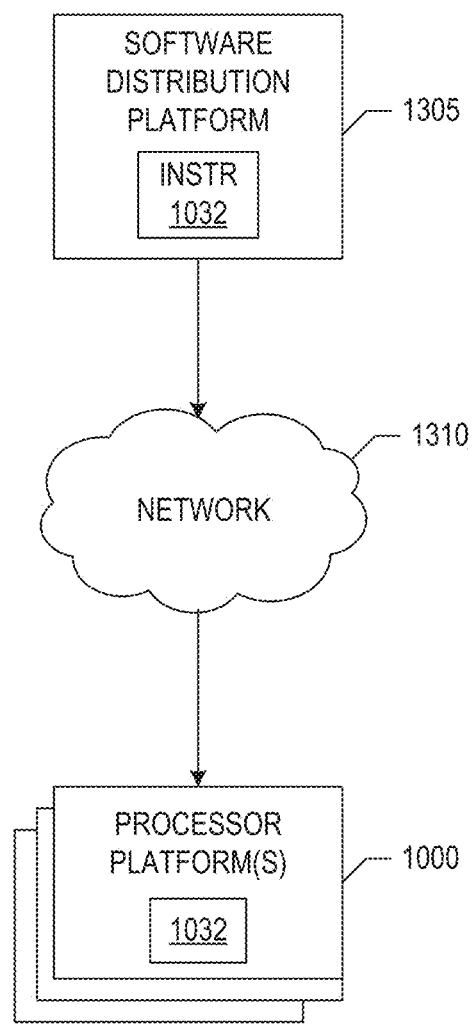
FIG. 13 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 400 of FIG. 4, as described above. The one or more servers of the example software distribution platform 1305 are in communication with an example network 1310, which may correspond to any one or more of the Internet and/or any of the example network 104 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 400 of FIG. 4, may be downloaded to the example processor platform 1000, which is to execute the machine readable instructions 1032 to implement the transfer learner circuitry 108. In some examples, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that transfer learning from a pre-trained transformer neural network. Disclosed systems, methods, apparatus, and articles of manufacture improve the efficiency of using a computing device by using a relatively small, application specific training data set to adjust the parameters of a transformer neural network that was previously trained on a relatively large, generic data set. As such, example transfer learner circuitry can perform application specific tasks (such as web content categorization) with high levels of accuracy that are unobtainable using the pre-trained model in its original configuration. Additionally, the example transfer learner circuitry can obtain the high level of accuracy in application specific tasks without requiring a relatively large amount of application specific training data. Furthermore, the example transfer learner circuitry may exhibit zero shot learning by accurately performing application specific tasks in a category without having application specific training data for that specific category. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to classify web content are disclosed herein. Further examples and combinations thereof include the following.

Example 1 includes an apparatus to categorize web content, the apparatus comprising interface circuitry to receive first results data from a pre-trained model, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions in the apparatus, and one or more registers to store a result of the one or more first operations, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate model tuner circuitry to determine, based on the first results data, an adjustment to a parameter of the pre-trained model, and provide, via the interface circuitry, the adjustment to the pre-trained model, and feature extractor circuitry to receive, via the model tuner circuitry, second results data that satisfies a performance threshold, and identify, from the second results data, at least one application specific feature from a tuned version of the pre-trained model.

Example 2 includes the apparatus of example 1, wherein the processor circuitry is further to instantiate classifier circuitry to classify unlabeled web content using the at least one application specific features.

Example 3 includes the apparatus of example 2, wherein the classifier circuitry is to use a classification technique different from the pre-trained model.

Example 4 includes the apparatus of example 2, wherein known labels from an application specific training data set describe web content written in a first language, a first portion of the unlabeled web content is written in the first language, a second portion of the unlabeled web content is written in a second language, the classification of the unlabeled web content includes a first set of labels corresponding to the first portion and a second set of labels corresponding to the second portion, and the first set of labels and the second set of labels both satisfy a performance threshold.

Example 5 includes the apparatus of example 1, wherein the first results data include sample labels corresponding to web content, and to determine the adjustment, the model tuner circuitry is to compare the sample labels to known labels from an application specific training data set.

Example 6 includes the apparatus of example 1, wherein the pre-trained model is a transformer neural network originally trained on a first amount of data unrelated to web content, and the model tuner circuitry is further to determine the adjustment to the parameter based on a second amount of data related to web content, the second amount of data less than the first amount of data.

Example 7 includes the apparatus of example 1, wherein the model tuner circuitry is further to determine the second results data satisfies the performance threshold based on a one or more of an accuracy, precision, or recall measurement of the second results data.

Example 8 includes the apparatus of example 1, wherein, in response to a determination that the second results data fails to satisfy the performance threshold, the model tuner circuitry is further to iteratively provide additional parameter adjustments and receive additional results data until a set of results data satisfies the performance threshold.

Example 9 includes the apparatus of example 1, wherein, for web content categorization, the at least one application specific feature includes at least one of (a) a format of a web site, (b) a number of words on the web site, (c) an average sentence length, and (d) a number of key words on the web site.

Example 10 includes a non-transitory machine readable storage medium comprising instructions that, when executed, cause processor circuitry to at least receive first results data from a pre-trained model, determine, based on the first results data, an adjustment to a parameter of the pre-trained model, provide the adjustment to the pre-trained model, receive second results data from an adjusted version of the pre-trained model that satisfies a performance threshold, and identify, from the second results data, at least one application specific feature from the adjusted version of the pre-trained model.

Example 11 includes the non-transitory machine readable storage medium of example 10, wherein the instructions, when executed, cause the processor circuitry to classify unlabeled web content using the at least one application specific features.

Example 12 includes the non-transitory machine readable storage medium of example 11, wherein the instructions cause the processor circuitry to use a classification technique different from the pre-trained model.

Example 13 includes the non-transitory machine readable storage medium of example 11, wherein known labels from an application specific training data set describe web content written in a first language, a first portion of the unlabeled web content is written in the first language, a second portion of the unlabeled web content is written in a second language, the classification of the unlabeled web content includes a first set of labels corresponding to the first portion and a second set of labels corresponding to the second portion, and the first set of labels and the second set of labels both satisfy a performance threshold.

Example 14 includes the non-transitory machine readable storage medium of example 10, wherein the first results data include sample labels corresponding to web content, and to determine the adjustment, the instructions, when executed, cause the processor circuitry to compare the sample labels to known labels from an application specific training data set.

Example 15 includes the non-transitory machine readable storage medium of example 10, wherein the pre-trained model is a transformer neural network originally trained on a first amount of data unrelated to web content, and the instructions cause the processor circuitry to determine the adjustment to the parameter based on a second amount of data related to web content, the second amount of data less than the first amount of data.

Example 16 includes the non-transitory machine readable storage medium of example 10, wherein the instructions cause the processor circuitry to determine the second results data satisfies the performance threshold based on a one or more of an accuracy, precision, or recall measurement of the second results data.

Example 17 includes the non-transitory machine readable storage medium of example 10, wherein, in in response to a determination that the second results data fails to satisfy the performance threshold, the instructions cause the processor circuitry to iteratively provide additional parameter adjustments and receive additional results data until a set of results data satisfies the performance threshold.

Example 18 includes the non-transitory machine readable storage medium of example 10, wherein, for web content categorization, the at least one application specific feature includes at least one of (a) a format of a web site, (b) a number of words on the web site, (c) an average sentence length, and (d) a number of key words on the web site.

Example 19 includes a method to categorize web content, the method comprising receiving first results data from a pre-trained model, determining, based on the first results data, an adjustment to a parameter of the pre-trained model, providing the adjustment to the pre-trained model, receiving second results data from an adjusted version of the pre-trained model that satisfies a performance threshold, and identifying, from the second results data, at least one application specific feature from the adjusted version of the pre-trained model.

Example 20 includes the method of example 19, further including classifying unlabeled web content using the at least one application specific features.

Example 21 includes the method of example 20, wherein classifying the unlabeled web content further includes using a classification technique different from the pre-trained model.

Example 22 includes the method of example 20, wherein known labels from an application specific training data set describe web content written in a first language, a first portion of the unlabeled web content is written in the first language, a second portion of the unlabeled web content is written in a second language, the classification of the unlabeled web content includes a first set of labels corresponding to the first portion and a second set of labels corresponding to the second portion, and the first set of labels and the second set of labels both satisfy a performance threshold.

Example 23 includes the method of example 19, wherein the first results data include sample labels corresponding to web content, and determining the adjustment further includes comparing the sample labels to known labels from an application specific training data set.

Example 24 includes the method of example 19, wherein the pre-trained model is a transformer neural network originally trained on a first amount of data unrelated to web content, and the method further includes determining the adjustment to the parameter based on a second amount of data related to web content, the second amount of data less than the first amount of data.

Example 25 includes the method of example 19, further including determining the second results data satisfies the performance threshold based on a one or more of an accuracy, precision, or recall measurement of the second results data.

Example 26 includes the method of example 19, wherein, in in response to a determination that the second results data fails to satisfy the performance threshold, the method further includes iteratively providing additional parameter adjustments and receive additional results data until a set of results data satisfies the performance threshold.

Example 27 includes the method of example 19, wherein, for web content categorization, the at least one application specific feature includes at least one of (a) a format of a web site, (b) a number of words on the web site, (c) an average sentence length, and (d) a number of key words on the web site.

Example 28 includes an apparatus to categorize web content, the apparatus comprising means for communicating to receive first results data from a pre-trained model, means for tuning to determine, based on the first results data, an adjustment to a parameter of the pre-trained model, and provide, via the means for communicating, the adjustment to the pre-trained model, and means for extracting to receive, via the means for tuning, second results data that satisfies a performance threshold, and identify, from the second results data, at least one application specific feature from a tuned version of the pre-trained model.

Example 29 includes the apparatus of example 28, further including means for classifying to classify unlabeled web content using the at least one application specific features.

Example 30 includes the apparatus of example 29, wherein the means for classifying uses a classification technique different from the pre-trained model.

Example 31 includes the apparatus of example 29, wherein known labels from an application specific training data set describe web content written in a first language, a first portion of the unlabeled web content is written in the first language, a second portion of the unlabeled web content is written in a second language, the classification of the unlabeled web content includes a first set of labels corresponding to the first portion and a second set of labels corresponding to the second portion, and the first set of labels and the second set of labels both satisfy a performance threshold.

Example 32 includes the apparatus of example 28, wherein the first results data include sample labels corresponding to web content, and to determine the adjustment, the means for tuning is to compare the sample labels to known labels from an application specific training data set.

Example 33 includes the apparatus of example 28, wherein the pre-trained model is a transformer neural network originally trained on a first amount of data unrelated to web content, and the means for tuning is further to determine the adjustment to the parameter based on a second amount of data related to web content, the second amount of data less than the first amount of data.

Example 34 includes the apparatus of example 28, wherein the means for tuning is further to determine the second results data satisfies the performance threshold based on a one or more of an accuracy, precision, or recall measurement of the second results data.

Example 35 includes the apparatus of example 28, wherein, in response to a determination that the second results data fails to satisfy the performance threshold, the means for tuning is further to iteratively provide additional parameter adjustments and receive additional results data until a set of results data satisfies the performance threshold.

Example 36 includes the apparatus of example 28, wherein, for web content categorization, the at least one application specific feature includes at least one of (a) a format of a web site, (b) a number of words on the web site, (c) an average sentence length, and (d) a number of key words on the web site.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to categorize web content, the apparatus comprising:
    interface circuitry to receive first results data from a pre-trained model;
    machine-readable instructions; and
    at least one processor circuit to be programmed by the machine-readable instructions to:
        in response to the first results data not satisfying a performance threshold, determine an adjustment to a parameter of the pre-trained model, the adjustment to the parameter of the pre-trained model to increase similarity between the first results data and an output of the pre-trained model;
        provide, via the interface circuitry, the adjustment to the pre-trained model;
        receive second results data that satisfies the performance threshold;
        in response to the second results data satisfying the performance threshold, identify, from the second results data, at least one application specific feature from a tuned version of the pre-trained model, the at least one application specific feature to be used to classify web content; and
        classify unlabeled data using the tuned version of the pre-trained model, wherein known labels from an application specific training data set describe web content written in a first language, a first portion of unlabeled web content is written in the first language, a second portion of the unlabeled web content is written in a second language, and a classification of the unlabeled web content includes a first set of labels corresponding to the first portion and a second set of labels corresponding to the second portion.

2. The apparatus of claim 1, wherein one or more of the at least one processor circuit is to use a classification technique different from the pre-trained model.

3. The apparatus of claim 1, wherein:
the first results data include sample labels corresponding to the web content; and
to determine the adjustment, one or more of the at least one processor circuit is to compare the sample labels to known labels from the application specific training data set.

4. The apparatus of claim 1, wherein:
the pre-trained model is a transformer neural network originally trained on a first amount of data unrelated to the web content; and
one or more of the at least one processor circuit is further to determine the adjustment to the parameter based on a second amount of data related to the web content, the second amount of data less than the first amount of data.

5. The apparatus of claim 1, wherein one or more of the at least one processor circuit is further to determine the second results data satisfies the performance threshold based on one or more of an accuracy, precision, or recall measurement of the second results data.

6. The apparatus of claim 1, wherein, in response to a determination that the second results data fails to satisfy the performance threshold, one or more of the at least one processor circuit is further to iteratively provide additional parameter adjustments and receive additional results data until a set of results data satisfies the performance threshold.

7. The apparatus of claim 1, wherein, for web content categorization, the at least one application specific feature includes at least one of: (a) a format of a web site, (b) a number of words on the web site, (c) an average sentence length, and (d) a number of key words on the web site.

8. The apparatus of claim 1, wherein one or more of the at least one processor circuit is to cause classification of the unlabeled web content based on the at least one application specific feature.

9. The apparatus of claim 1, wherein the classification of the unlabeled web content is a first classification, and wherein one or more of the at least one processor circuit is to determine the second results data satisfy the performance threshold based on whether a second classification for the web content matches the second classification for the web content stored in a database.

10. A non-transitory machine readable storage medium comprising instructions to cause at least one processor circuit to at least:
receive first results data from a pre-trained model;
in response to the first results data not satisfying a performance threshold, determine an adjustment to a parameter of the pre-trained model, the adjustment to the parameter of the pre-trained model to increase similarity between the first results data and an output of the pre-trained model;
provide the adjustment to the pre-trained model;
receive second results data from an adjusted version of the pre-trained model that satisfies the performance threshold;
in response to the second results data satisfying the performance threshold, identify, from the second results data, at least one application specific feature from the adjusted version of the pre-trained model, the at least one application specific feature to be used to classify web content; and
classify unlabeled data using the adjusted version of the pre-trained model, wherein known labels from an application specific training data set describe web content written in a first language, a first portion of unlabeled web content is written in the first language, a second portion of the unlabeled web content is written in a second language, and a classification of the unlabeled web content includes a first set of labels corresponding to the first portion and a second set of labels corresponding to the second portion.

11. The non-transitory machine readable storage medium of claim 10, wherein the instructions are to cause one or more of the at least one processor circuit to use a classification technique different from the pre-trained model.

12. The non-transitory machine readable storage medium of claim 10, wherein:
the first results data include sample labels corresponding to the web content; and
to determine the adjustment the instructions are to cause one or more of the at least one processor circuit to compare the sample labels to known labels from the application specific training data set.

13. The non-transitory machine readable storage medium of claim 10, wherein:
the pre-trained model is a transformer neural network originally trained on a first amount of data unrelated to the web content; and
the instructions are to cause one or more of the at least one processor circuit to determine the adjustment to the parameter based on a second amount of data related to the web content, the second amount of data less than the first amount of data.

14. The non-transitory machine readable storage medium of claim 10, wherein the instructions are to cause one or more of the at least one processor circuit to determine the second results data satisfies the performance threshold based on one or more of an accuracy, precision, or recall measurement of the second results data.

15. The non-transitory machine readable storage medium of claim 10, wherein, in response to a determination that the second results data fails to satisfy the performance threshold, the instructions are to cause one or more of the at least one processor circuit to iteratively provide additional parameter adjustments and receive additional results data until a set of results data satisfies the performance threshold.

16. The non-transitory machine readable storage medium of claim 10, wherein, for web content categorization, the at least one application specific feature includes at least one of: (a) a format of a web site, (b) a number of words on the web site, (c) an average sentence length, and (d) a number of key words on the web site.

17. A method to categorize web content, the method comprising:
receiving first results data from a pre-trained model;
in response to the first results data not satisfying a performance threshold, determining an adjustment to a parameter of the pre-trained model, the adjustment to the parameter of the pre-trained model to increase similarity between the first results data and an output of the pre-trained model;
providing the adjustment to the pre-trained model;
receiving second results data from an adjusted version of the pre-trained model that satisfies the performance threshold;
in response to the second results data satisfying the performance threshold, identifying, from the second results data at least one application specific feature from the adjusted version of the pre-trained model; and
classifying unlabeled data using the adjusted version of the pre-trained model, wherein known labels from an application specific training data set describe web content written in a first language, a first portion of unlabeled web content is written in the first language, a second portion of the unlabeled web content is written in a second language, and a classification of the unlabeled web content includes a first set of labels corresponding to the first portion and a second set of labels corresponding to the second portion.

18. The method of claim 17, further including classifying the unlabeled web content using the at least one application specific feature.

* * * * *